US010925030B2

(12) United States Patent
Han et al.

(10) Patent No.: US 10,925,030 B2
(45) Date of Patent: Feb. 16, 2021

(54) APPARATUS AND METHOD FOR CONTROLLING DIRECTIVITY IN WIRELESS COMMUNICATION SYSTEM

(71) Applicant: Samsung Electronics Co., Ltd., Suwon-si (KR)

(72) Inventors: Kwanghoon Han, Suwon-si (KR); Da-Woon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/046,384

(22) Filed: Jul. 26, 2018

(65) Prior Publication Data

US 2019/0037530 A1    Jan. 31, 2019

(30) Foreign Application Priority Data

Jul. 28, 2017 (KR) ........................ 10-2017-0096408

(51) Int. Cl.
*H04W 64/00* (2009.01)
*H04B 7/06* (2006.01)
*H04B 7/08* (2006.01)
*H04W 16/28* (2009.01)

(52) U.S. Cl.
CPC ........ *H04W 64/006* (2013.01); *H04B 7/0617* (2013.01); *H04B 7/0695* (2013.01); *H04B 7/088* (2013.01); *H04W 16/28* (2013.01)

(58) Field of Classification Search
CPC .... H04W 64/006; H04W 16/28; H04B 7/088; H04B 7/0695; H04B 7/0617; H01Q 25/00
See application file for complete search history.

(56) References Cited

U.S. PATENT DOCUMENTS

| 9,515,372 B2 | 12/2016 | Chang et al. |
| 9,609,468 B1 | 3/2017 | Moscovich et al. |
| 2010/0159845 A1 | 6/2010 | Kaaja et al. |
| 2011/0211490 A1 | 9/2011 | Nikula et al. |
| 2013/0040682 A1* | 2/2013 | Chang .................... H01Q 1/243 342/368 |

(Continued)

FOREIGN PATENT DOCUMENTS

| CA | 2388463 A1 | 5/2001 |
| EP | 3122094 A1 | 1/2017 |

(Continued)

OTHER PUBLICATIONS

US 9,287,611 B2, 03/2016, Chang et al. (withdrawn)

(Continued)

*Primary Examiner* — Vinncelas Louis
(74) *Attorney, Agent, or Firm* — Jefferson IP Law, LLP

(57) ABSTRACT

An apparatus in a wireless communication system is provided. The apparatus includes at least one transceiver and at least one processor operably coupled to the at least one transceiver. The at least one processor is configured to determine first direction information regarding a first direction of a first beam of the apparatus, determine second direction information regarding a second direction of a second beam of the apparatus based on measurement information regarding a movement of the apparatus, and perform a beam search with another apparatus based on the first direction information and the second direction information.

18 Claims, 21 Drawing Sheets

(56) References Cited

U.S. PATENT DOCUMENTS

| | | |
|---|---|---|
| 2014/0293870 A1 | 10/2014 | Li et al. |
| 2016/0065286 A1* | 3/2016 | Kim ................ H04B 7/0617 |
| | | 370/330 |
| 2016/0165583 A1* | 6/2016 | Ho ................ H04B 7/0695 |
| | | 370/329 |
| 2017/0127398 A1 | 5/2017 | Andgart et al. |
| 2017/0155439 A1 | 6/2017 | Chang et al. |
| 2017/0164368 A1* | 6/2017 | Nishikawa ............ H04L 43/16 |
| 2017/0187110 A1* | 6/2017 | Fujio ................ H01Q 25/00 |
| 2018/0219595 A1 | 8/2018 | Liu et al. |

FOREIGN PATENT DOCUMENTS

| | | |
|---|---|---|
| KR | 10-2011-0069176 A | 6/2011 |
| WO | 2017020202 A1 | 2/2017 |

OTHER PUBLICATIONS

Wikipedia, Gimbal, https://en.wikipedia.org/wiki/Gimbal, Jun. 11, 2018.
International Search Report dated Nov. 6, 2018, issued in International Application No. PCT/KR2018/008453.
Partial Supplemental European Search Report dated Apr. 23, 2020, issued in a European Application No. 18838094.3.
Extended European Search Report dated Aug. 14, 2020, issued in a European Application No. 18838094.3—1213/3646475.
MAC-Layer Concurrent Beamfornli11g Protocol for I11door Millimeter-Wave Networks; IEEE Transactions on Vehicular Technology, vol. 64, No. 1; Jan. 2015.

* cited by examiner

APPARATUS AND METHOD FOR CONTROLLING DIRECTIVITY IN WIRELESS COMMUNICATION SYSTEM

CROSS-REFERENCE TO RELATED APPLICATION(S)

This application is based on and claims priority under 35 U.S.C. § 119 of a Korean patent application number 10-2017-0096408, filed on Jul. 28, 2017, in the Korean Intellectual Property Office, the disclosure of which is incorporated by reference herein in its entirety.

BACKGROUND

1. Field

The present disclosure generally relates to a wireless communication system and, more specifically, to an apparatus and a method for controlling directivity in a wireless communication system.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

5G communication systems are being operated to increase signal gain using a beamforming technique in order to overcome the problem of path loss due to the characteristics of a super high frequency band (e.g., mmWave). In a beamforming-based wireless communication system, each of a base station and a terminal performs a beam search in order to find an optimal beam. Meanwhile, the direction in which the beam is oriented may vary depending on the movement of the terminal, and there may be the difference between the direction indicated by the actual beam and the direction required by the terminal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an optimal beam in a wireless communication system.

Additional aspects will be set forth in part in the description which follows and, in part, will be apparent from the description, or may be learned by practice of the presented embodiments.

The disclosure provides an apparatus and a method for searching for an optimal beam in consideration of the movement of a terminal in a wireless communication system.

The disclosure provides an apparatus and a method for transforming respective beams operated in a terminal into information on directions in a wireless communication system.

The disclosure provides an apparatus and a method for compensating for the movement of a terminal using a sensor in a wireless communication system.

The disclosure provides an apparatus and a method for compensating for the movement of a terminal in a wireless communication system, thereby maintaining a beamforming configuration in a specific direction.

The disclosure provides an apparatus and a method for performing a beam search by efficiently using resources despite the movement of a terminal in a wireless communication system.

The disclosure provides an apparatus and a method for extending the coverage of a beam search in consideration of the movement of a terminal in a wireless communication system.

The disclosure provides an apparatus and a method for efficiently selecting beams by predicting the movement of a terminal in a wireless communication system.

In accordance with an aspect of the disclosure, an apparatus in a wireless communication system is provided. The apparatus includes at least one transceiver and at least one processor operably coupled to the at least one transceiver. The at least one processor is configured to determine first direction information regarding a first direction of a first beam of the apparatus, determine second direction information regarding a second direction of a second beam of the apparatus based on measurement information regarding a movement of the apparatus, and perform a beam search with another apparatus based on the first direction information and the second direction information.

In accordance with another aspect of the disclosure, a method for operating an apparatus in a wireless communication system is provided. The method includes determining first direction information regarding a first direction of a first beam of the apparatus determining second direction information regarding a second direction of a second beam of the apparatus based on measurement information regarding a movement of the apparatus, and performing a beam search with another apparatus based on the first direction information and the second direction information.

An apparatus and a method according to various embodiments of the disclosure enable efficient beam selection by taking into account the actual direction of a beam depending on the movement of a terminal.

Effects which can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
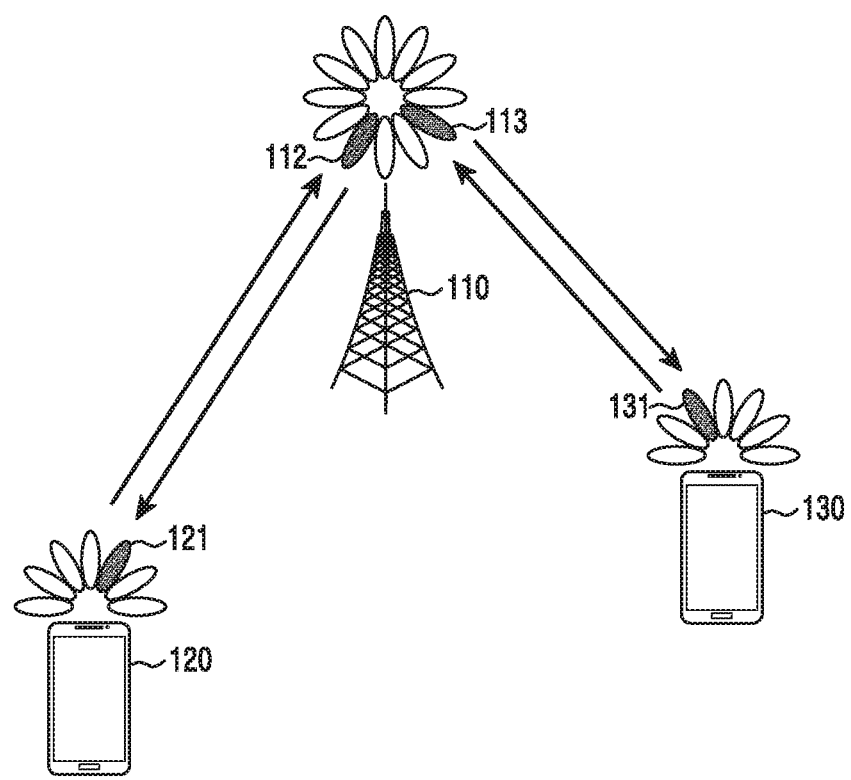
FIG. 1 illustrates a wireless communication system according to various embodiments of the disclosure.

The following description, with reference to the accompanying drawings, is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software and thus, the various embodiments of the disclosure may not exclude the perspective of software.

As used herein, singular forms may include plural forms as well unless the context clearly indicates otherwise. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the other element or connected to the other element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

Hereinafter, the disclosure relates to an apparatus and a method for performing a beam search in consideration of the movement of a terminal in a wireless communication system. More specifically, the disclosure describes a technique for performing a beam search by acquiring the direction in which the beam is actually radiated in consideration of the movement of a terminal, according to the purpose of beam-searching in a wireless communication system.

The terms referring to information (e.g., indices, resources, measured values, setting values, direction information, or control information), the terms (e.g., a terminal, a node, or an apparatus) referring to network entities, the terms (e.g., signals, data, or reports) referring to messages, and the terms (e.g., a controller or a sensor) referring to elements of an apparatus, which are used hereinafter, are illustrative words for the convenience of explanation. Accordingly, the disclosure is not limited to the terms described later, and other terms having equivalent technical meanings can be used.

Although the disclosure describes various embodiments using terms used in some communication standards {e.g., 3rd generation partnership project (3GPP)}, these are merely illustrative examples. The various embodiments of the disclosure can be easily modified and applied to other communication systems as well.

FIG. 1 illustrates a wireless communication system according to various embodiments of the disclosure. FIG. 1 illustrates a base station 110, a terminal 120, and a terminal 130 as some of nodes using a wireless channel in a wireless communication system. Although FIG. 1 shows only one base station, other base stations (e.g., a first base station 110-1 and a second base station 110-2 in FIG. 18), which are the same as or similar to the base station 110, may be further included.

The base station 110 is a network infrastructure that provides the terminals 120 and 130 with wireless access. The base station 110 has coverage defined as a specific geographic area based on the distance over which signals can be transmitted. The base station 110 may be referred to as an "access point (AP)", "evolved NodeB (eNB)", a "5G node ($5^{th}$ generation node)", a "wireless point", a "transmission/reception point (TRP)", or another term having the same technical meaning, in addition to the base station.

Each of the terminal 120 and the terminal 130 is a device used by a user and communicates with the base station 110 through a wireless channel. In some cases, at least one of the terminal 120 and the terminal 130 may be operated without user involvement. That is, at least one of the terminal 120 and the terminal 130 may be an apparatus for performing machine-type communication (MTC), which may not be carried by a user. Each of the terminal 120 and the terminal 130 may be referred to as a "user equipment (UE)", a "mobile station", a "subscriber station", a "customer premises equipment (CPE)", a "remote terminal", a "wireless terminal", an "electronic device", a "user device", or another term having a technical meaning equivalent thereto, in addition to the terminal.

The base station 110, the terminal 120, and the terminal 130 may transmit and receive wireless signals in a millimeter wave band (e.g., 28 GHz, 30 GHz, 38 GHz, or 60 GHz). In this case, in order to improve the channel gain, the base station 110, the terminal 120, and the terminal 130 may perform beamforming. The beamforming may include transmission beamforming and reception beamforming. That is, the base station 110, the terminal 120, and the terminal 130 may assign directivity to transmission signals or reception signals. To this end, the base station 110 and the terminals 120 and 130 may select serving beams 112, 113, 121, and 131 through a beam search or beam management procedure. After the serving beams 112, 113, 121, and 131 are selected, communication may be performed through resources having a QCL (quasi co-located) relationship with the resources that have transmitted the serving beams 112, 113, 121, and 131.

Figure 2:
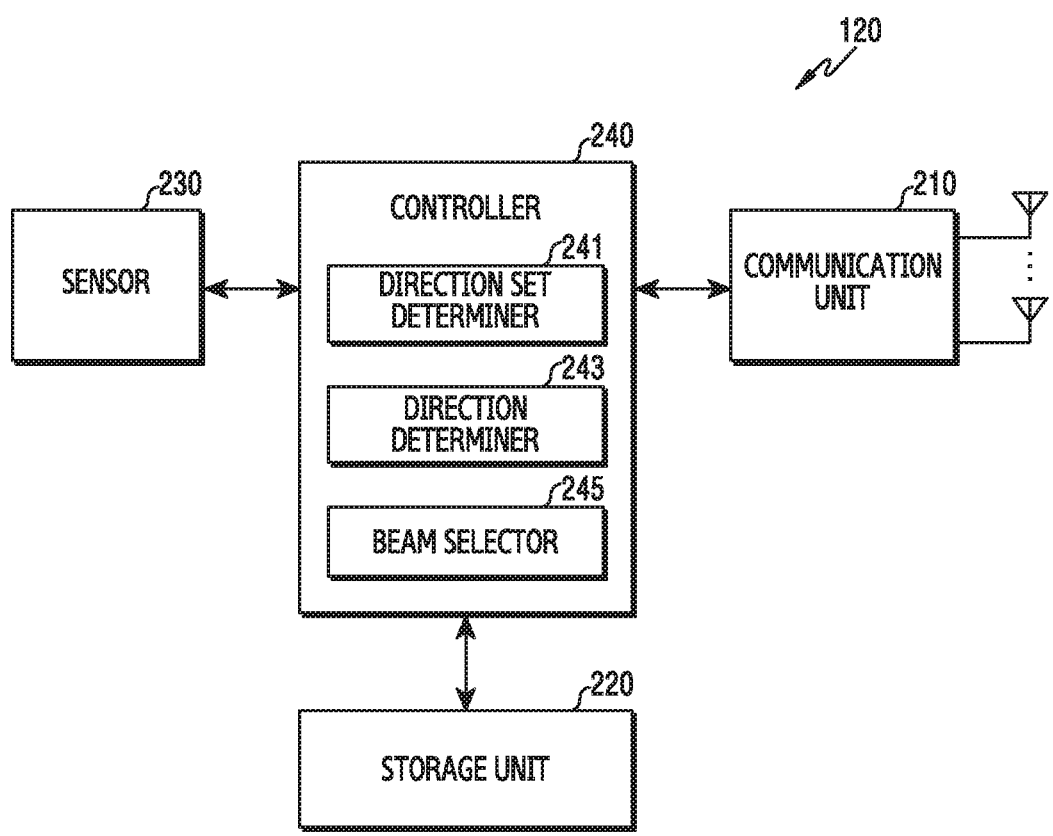
FIG. 2 illustrates a configuration of a terminal in a wireless communication system according to various embodiments of the disclosure.

FIG. 2 illustrates an example of a configuration of a terminal in a wireless communication system according to various embodiments of the disclosure. The configuration illustrated in FIG. 2 may be understood as a configuration of the terminal 120. Hereinafter, the term "-unit", "-or(er)", or the like denotes a unit for processing at least one function or operation, and may be implemented by hardware, software, or a combination thereof.

Referring to FIG. 2, the terminal 120 includes a communication unit 210 (e.g., a transceiver), a storage unit 220 (e.g., a memory), a sensor 230, and a controller 240 (e.g., at least one processor).

The communication unit 210 performs functions for transmitting and receiving signals through a wireless channel. For example, the communication unit 210 may perform a function of transformation between a baseband signal and a bit stream depending on the physical layer specification of a system. For example, in the case of data transmission, the communication unit 210 generates complex symbols by encoding and modulating a transmission bit stream. In the case of data reception, the communication unit 210 restores a reception bit stream by demodulating and decoding a baseband signal. In addition, the communication unit 210 up-converts a baseband signal to an RF band signal to thus transmit the same through an antenna, and down-converts an RF band signal received through an antenna to a baseband signal. For example, the communication unit 210 may include a transmitting filter, a receiving filter, an amplifier, a mixer, an oscillator, a DAC, an ADC, and the like.

In addition, the communication unit 210 may include a plurality of transmission/reception paths. Further, the communication unit 210 may include at least one antenna array including a plurality of antenna elements. In terms of hardware, the communication unit 210 may include digital circuits and analog circuits {e.g., a radio frequency integrated circuit (RFIC)}. The digital circuit and the analog circuit may be implemented as a single package. The communication unit 210 may also include a plurality of RF chains. Further, the communication unit 210 may perform beamforming.

The communication unit 210 may include different communication modules to process signals of different frequency bands. Further, the communication unit 210 may include a plurality of communication modules to support a plurality of different wireless access technologies. For example, the different wireless access technologies may include bluetooth low energy (BLE), Wi-Fi, Wi-Fi gigabyte (WiGig), cellular networks {e.g., long term evolution (LTE)}, and the like. In addition, the different frequency bands may include super high frequency (SHF) (e.g., 2.5 GHz or 5 GHz) bands and millimeter wave (MMF) (e.g., 38 GHz, 60 GHz, etc.) bands. According to various embodiments, the communication module may include at least one sensor. A sensor mounted in a communication module may provide a processor {e.g., a communication processor (CP)} in the communication module with measurement information (or sensor information) for operation of directivity control.

The communication unit 210 transmits and receives signals as described above. Accordingly, all or a part of the communication unit 210 may be referred to as a "transmitter", a "receiver", or a "transceiver". In the following description, the transmission and reception performed through a wireless channel will be used to encompass the execution of the process by the communication unit 210 as described above.

The storage unit 220 stores data such as fundamental programs, application programs, and configuration information for the operation of the terminal 120. The storage unit 220 may be configured as a volatile memory, a non-volatile memory, or a combination thereof. The storage unit 220 provides stored data upon request by the controller 240. According to various embodiments, the storage unit 220 may store information (e.g., a beam index table) on respective beams that can be operated by the terminal 120 using indices. According to various embodiments, the storage unit 220 may store information on direction differences of the respective beams of the terminal (e.g., beam distances in FIG. 14).

The sensor 230 may measure a physical quantity of the terminal 120, or may detect the operation state of the terminal 120, thereby converting the measured or detected information into an electric signal. The sensor 230 may include at least one of, for example, a gesture sensor, a gyro-sensor, a geomagnetic sensor, an atmospheric pressure sensor, a magnetic sensor, an acceleration sensor, a grip sensor, a proximity sensor, a color sensor, a biometric sensor, a temperature/humidity sensor, a hall sensor, an illuminance sensor, or an ultraviolet (UV) sensor. The sensor 230 may further include a control circuit for controlling at least one or more sensors included therein. According to various embodiments, the sensor 230 provides measured or detected information (hereinafter, referred to as "measurement information") upon request by the controller 240. The sensor 230 may provide measurement information to an AP of the terminal 120. As another example, the sensor 230 may provide measurement information to a CP of the terminal 120.

The controller 240 controls overall operation of the terminal 120. For example, the controller 240 transmits and receives signals through the communication unit 210. In addition, the controller 240 writes and reads data to and from the storage unit 220. The controller 240 may perform functions of the protocol stack required by the communication standard. To this end, the controller 240 may include at least one of a processor or a microprocessor, or may be a part of the processor. Also, a part of the communication unit 210 and the controller 240 may be referred to as a "CP". The controller 240 may include various modules to perform communications. According to various embodiments, the controller 240 may include a direction set determiner 241 that identifies candidates to be searched for based on information obtained from the sensor. Alternatively, the controller 240 may include a direction determiner 243 that determines the direction in which the search is performed according to the purpose of beam search. Alternatively, the controller 240 may include a beam selector 245 that selects a beam index corresponding to the direction in which the search is performed. The direction set determiner 241, the direction determiner 243, or the beam selector 245 may be a command set or codes stored in the controller 240, and may be commands/codes or a storage space storing the commands/codes, which are, at least temporarily, resided in the controller 240, or may be a part of a circuitry constituting the controller 240 or a module for performing functions of the controller 240. According to various embodiments, the controller 240 may store directivity information on the direction in which the beam is oriented. Based on the directivity information and the measurement information received from the sensor 230, the controller 240 may perform a beam search. For example, the controller 240 may perform control such that the terminal performs operations according to various embodiments described below.

Figure 3:
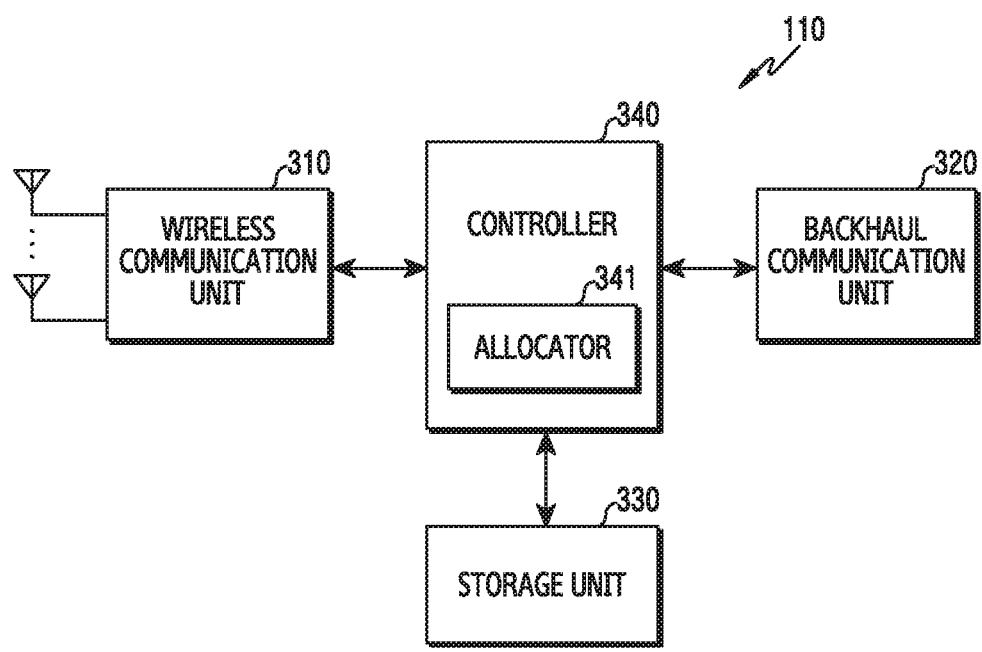
FIG. 3 illustrates a configuration of a base station in a wireless communication system according to various embodiments of the disclosure.

FIG. 3 illustrates an example of a configuration of a base station in a wireless communication system according to various embodiments of the disclosure. The configuration illustrated in FIG. 3 may be understood as a configuration of the base station 110. Hereinafter, the term "-unit", "-or(er)", or the like denotes a unit for processing at least one function or operation, and may be implemented by hardware, software, or a combination thereof.

Referring to FIG. 3, the base station 110 includes a wireless communication unit 310, a backhaul communication unit 320, a storage unit 330, and a controller 340.

The wireless communication unit 310 performs functions for transmitting and receiving signals through a wireless channel. For example, the wireless communication unit 310 may perform a function of transformation between a baseband signal and a bit stream depending on the physical layer specification of a system. For example, in the case of data transmission, the wireless communication unit 310 generates complex symbols by encoding and modulating a transmission bit stream. In the case of data reception, the wireless communication unit 310 restores a reception bit stream by demodulating and decoding a baseband signal. In addition, the wireless communication unit 310 up-converts a baseband signal to an RF (radio frequency) band signal to thus transmit the same through the antenna, and down-converts an RF band signal received through an antenna to a baseband signal.

To this end, the wireless communication unit 310 may include a transmitting filter, a receiving filter, an amplifier, a mixer, an oscillator, a digital-to-analog convertor (DAC), an analog-to-digital convertor (ADC), and the like. In addition, the wireless communication unit 310 may include a plurality of transmission/reception paths. Further, the wireless communication unit 310 may include at least one antenna array including a plurality of antenna elements. In terms of hardware, the wireless communication unit 310 may include digital units and analog units, and the analog unit may include a plurality of sub-units depending on operation power, operation frequency, and the like.

The wireless communication unit 310 transmits and receives signals as described above. Accordingly, all or a part of the wireless communication unit 310 may be referred to as a "transmitter", a "receiver", or a "transceiver". In the following description, the transmission and reception performed through a wireless channel will be used to encompass the execution of the process by the wireless communication unit 310 as described above.

The backhaul communication unit 320 provides an interface to perform communication with other nodes in the network. That is, the backhaul communication unit 320 converts a bit stream transmitted from the base station 110 to other nodes, such as another access node, another base station, an upper node, a core network, or the like, to a physical signal, and converts a physical signal received from another node to a bit stream.

The storage unit 330 stores data such as fundamental programs, application programs, and configuration information for the operation of the base station 110. The storage unit 330 may be configured as a volatile memory, a non-volatile memory, or a combination thereof. The storage unit 330 provides stored data upon request by the controller 340.

The controller 340 controls overall operation of the base station 110. For example, the controller 340 transmits and receives signals through the wireless communication unit 310 or through the backhaul communication unit 320. The controller 340 also writes and reads data to and from the storage unit 330. The controller 340 may perform functions of a protocol stack required by the communication specification. To this end, the controller 340 may include at least one processor. According to various embodiments, the controller 340 may include an allocator 341 that allocates resources for a beam search. The allocator 341 may be a command set or codes stored in the storage unit 330, and may be commands/codes or a storage space storing the commands/codes, which are, at least temporarily, resided in the controller 340, or may be a part of a circuitry constituting the controller 340. According to various embodiments, the controller 340 may perform control such that the base station 110 performs operations according to various embodiments described below.

Figure 4A:
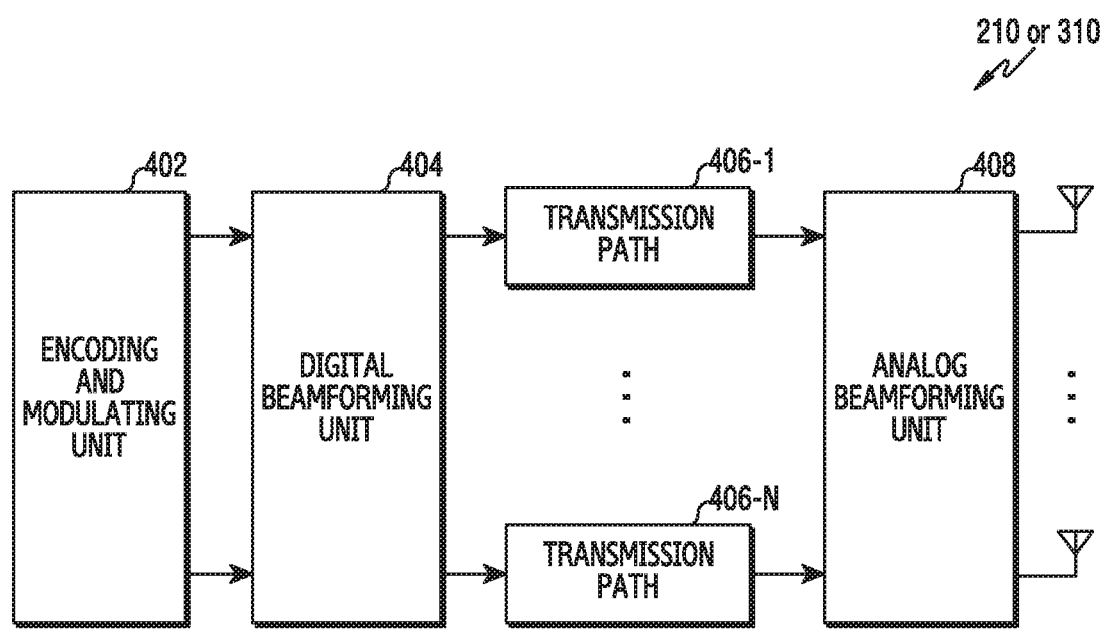
FIGS. 4A, 4B and 4C illustrate a configuration of a communication unit in a wireless communication system according to various embodiments of the disclosure.
Figure 4B:
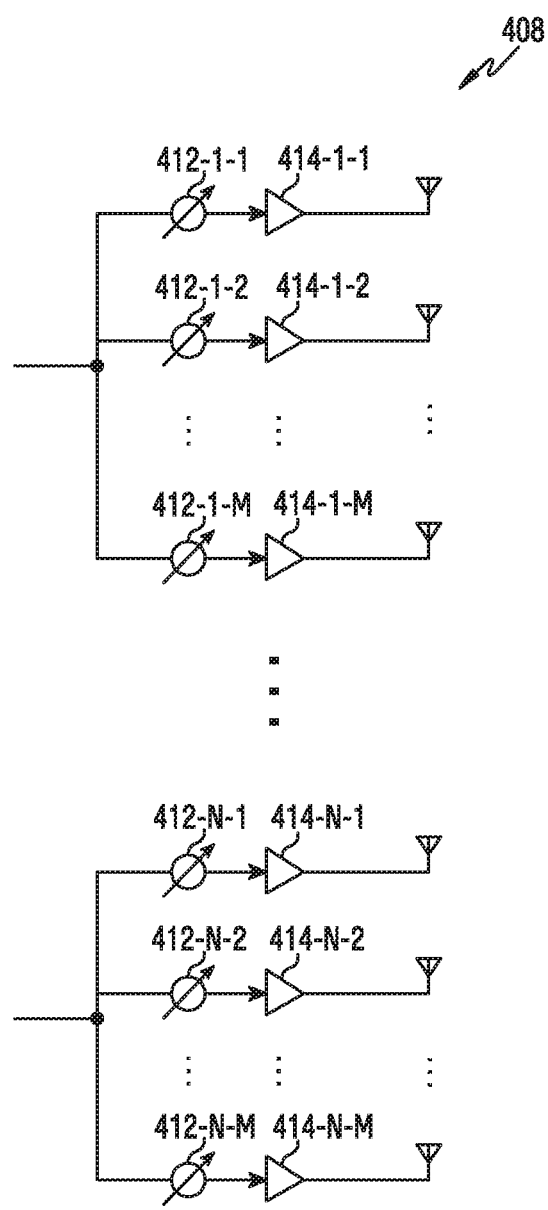
Figure 4C:
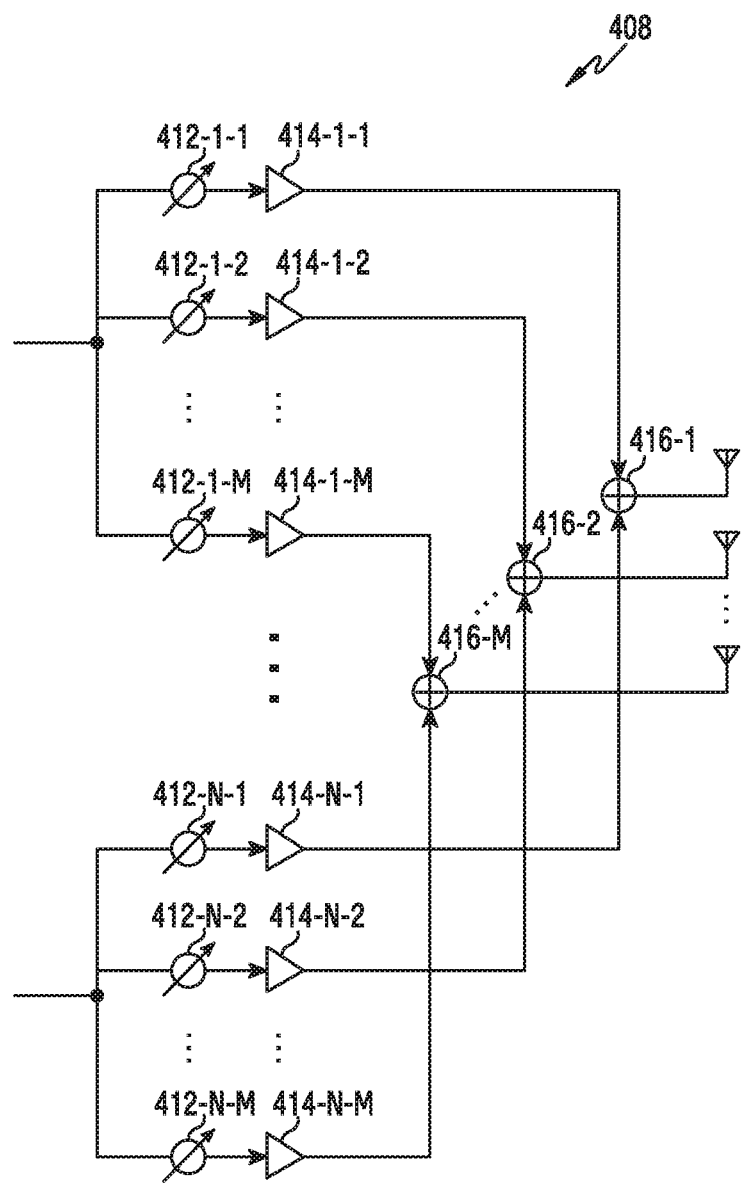

FIGS. 4A, 4B and 4C illustrate a configuration of a communication unit in a wireless communication system according to various embodiments of the disclosure. FIGS. 4A, 4B and 4C illustrate examples of the detailed configuration of the communication unit 210 in FIG. 2 or the wireless communication unit 310 in FIG. 3. More specifically, FIGS. 4A, 4B and 4C illustrate elements for performing beamforming as a part of the communication unit 210 in FIG. 2 or the wireless communication unit 310 in FIG. 3.

Referring to FIG. 4A, the communication unit 210 or the wireless communication unit 310 includes an encoding and modulating unit 402, a digital beamforming unit 404, a plurality of transmission paths 406-1 to 406-N, and an analog beamforming unit 408.

The encoding and modulating unit 402 performs channel encoding. For channel encoding, at least one of a low-density parity check (LDPC) code, a convolution code, and a polar code may be used. The encoding and modulating unit 402 generates modulation symbols by performing constellation mapping.

The digital beamforming unit 404 performs beamforming on digital signals (e.g., modulation symbols). To this end, the digital beamforming unit 404 multiplies the modulation symbols by beamforming weights. Here, the beamforming weights are used to change the magnitude and phase of a signal, and may be referred to as a "precoding matrix", a "precoder", or the like. The digital beamforming unit 404 outputs digital beamformed modulation symbols to a plurality of transmission paths 406-1 to 406-N. At this time, according to a multiple input multiple output (MIMO) transmission scheme, the modulation symbols may be multiplexed, or the same modulation symbol may be provided to the plurality of transmission paths 406-1 to 406-N.

The plurality of transmission paths 406-1 to 406-N convert the digital beamformed digital signals into analog signals. To this end, each of the plurality of transmission paths 406-1 to 406-N may include an inverse fast Fourier transform (IFFT) operator, a cyclic prefix (CP) inserter, a DAC, and an up-convertor. The CP inserter is intended for an orthogonal frequency division multiplexing (OFDM) scheme, and may be excluded when another physical layer scheme {e.g., FBMC (filter bank multi-carrier)} is applied. That is, the plurality of transmission paths 406-1 to 406-N provide independent signal processing processes for a plurality of streams generated through digital beamforming. However, depending on the implementation, some of the elements of the plurality of transmission paths 406-1 to 406-N may be used in common.

The analog beamforming unit 408 performs beamforming on the analog signals. To this end, the analog beamforming unit 408 multiplies the analog signals by beamforming weights. Here, the beamforming weights are used to change the magnitude and phase of the signal. More specifically, the analog beamforming unit 408 may be configured as shown in FIG. 4B or FIG. 4C depending on a connection structure between the plurality of transmission paths 406-1 to 406-N and the antennas.

Referring to FIG. 4B, signals input to the analog beamforming unit 408 are transmitted by antennas through phase/magnitude conversion and amplifying operation. At this time, the signals of the respective paths are transmitted through different antenna sets (i.e., antenna arrays). Referring to the processing of the signals input through the first path, the signals are converted into signal sequences having different or the same phase/magnitude by the phase/magnitude convertors 412-1-1 to 412-1-M, amplified by amplifiers 414-1-1 to 414-1-M, and then transmitted through the antennas.

Referring to FIG. 4C, signals input to the analog beamforming unit 408 pass through the phase/magnitude conversion and the amplifying operation, and are transmitted through antennas. At this time, the signals of the respective paths are transmitted through the same antenna set (i.e., the antenna array). Referring to the processing of the signals input through the first path, the signals are converted into signal sequences having different or the same phase/magnitude by the phase/magnitude convertors 412-1-1 to 412-1-May, and amplified by amplifiers 414-1-1 to 414-1-M. Then, the amplified signals are summed by the summers 416-1-1 to 416-1-M on the basis of the antenna elements so as to be transmitted through a single antenna array, and then transmitted through the antennas.

FIG. 4B shows an example in which an independent antenna array is used for each transmission path, and FIG. 4C shows an example in which transmission paths share a single antenna array. However, according to another embodiment, some transmission paths may use an independent antenna array, and the remaining transmission paths may share a single antenna array. Further, according to another embodiment, by applying a switchable structure between the transmission paths and the antenna arrays, a structure that may adaptively change according to the situation may be used.

The terminal may perform a beam search procedure in order to identify a beam suitable for communication with another node (e.g., the base station 110). Hereinafter, for the convenience of explanation, a downlink (DL) beam search procedure of a terminal and a base station will be described with reference to FIGS. 5 to 19, but the disclosure is not limited thereto. In other words, the directivity control of the disclosure may be utilized in an uplink (UL) beam search procedure, a beam search procedure in device-to-device communication {e.g., sidelink (SL)}, and all procedures using other beams, as well as in the downlink beam search procedure. In the disclosure, a procedure for transmitting and receiving signals through a plurality of beams for efficient beamforming will be referred to as a "beam search procedure", but "beam sweeping" or "beam training" may be used as the same or a similar meaning.

Directivity Control

Figure 5:
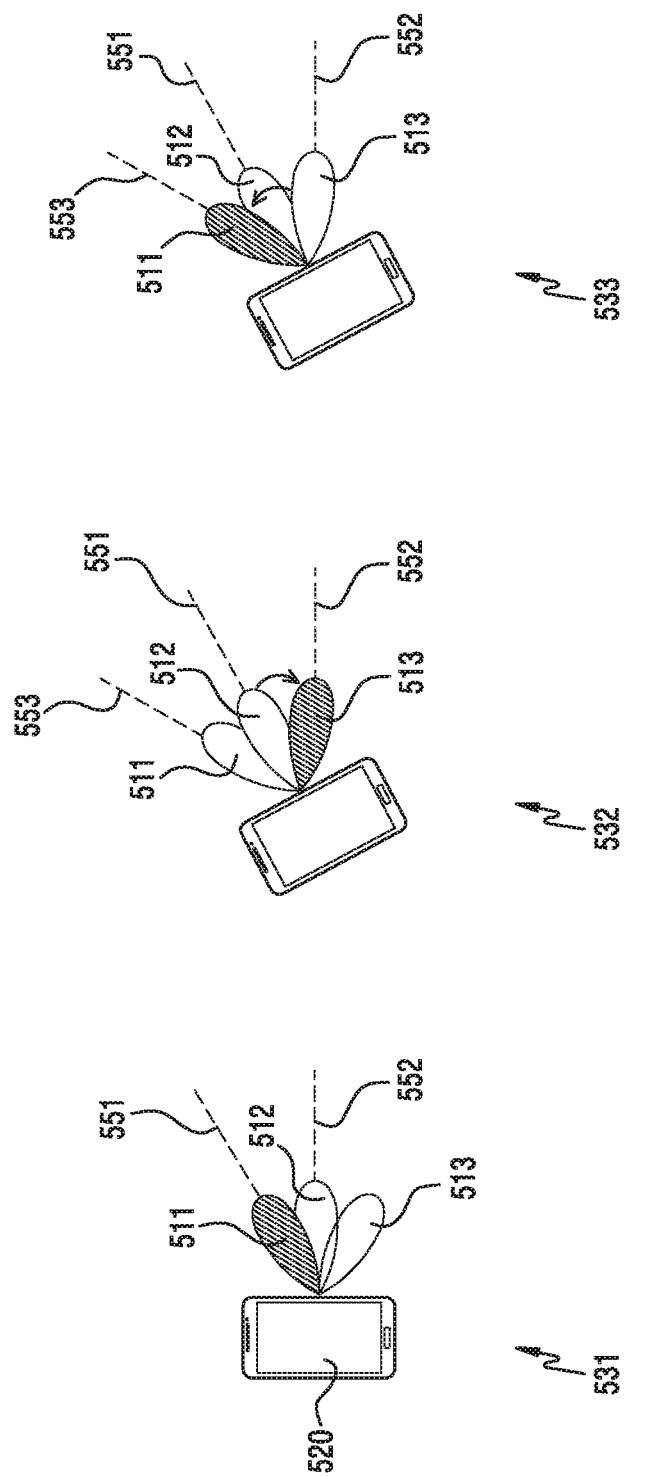
FIG. 5 illustrates directivity control according to various embodiments of the disclosure.

FIG. 5 illustrates an example of directivity control according to various embodiments of the disclosure. A terminal 520 in FIG. 5 illustrates the terminal 120 (or the terminal 130). Directivity control is a procedure for controlling the direction of the beam depending on the movement of the terminal so that the terminal meets the purpose of using the beam. The terminal changes, searches for, compensates for, or identifies the beam, taking into account the direction in which the beam is actually oriented, thereby controlling directivity. Directivity control may be an operation for directivity fixation to maintain the direction of the beam that is in use by the terminal (e.g., a base station beam search), or may be an operation for directivity diversity to transmit signals in multiple directions from the terminal (a terminal beam search), depending on the purpose thereof.

Referring to FIG. 5, the terminal 520 may receive signals from a base station (not shown). The terminal 520 may perform a beam search procedure in order to improve the quality of a reception signal. The terminal 520 may identify a beam (downlink reception beam) to be used for downlink communication through a beam search procedure. The terminal 520, as a beam search procedure, may receive signals through respective beams operated in the terminal 520. The signal may be a reference signal transmitted from the base station. For example, the reference signal may be one of a beam reference signal (BRS), a beam refinement reference signal (BRRS), a cell-specific reference signal (CRS), a channel state information-reference signal (CSI-RS), and a demodulation-RS (DM-RS). According to another embodiment, the reference signal may be replaced by a synchronization signal (SS).

The terminal 520 may receive a plurality of signals from the base station. The terminal 520 may receive a plurality of signals by means of different beams, respectively. The terminal 520 may measure the signals received through the respective beams to thus determine the channel quality for each beam. When identifying the beam, various indices indicative of the channel quality may be used. For example, the channel quality may be beam reference signal received power (BRSRP) and reference signal received power (RSRP), and may be at least one of reference signal received quality (RSRQ), a received signal strength indicator (RSRI), a signal-to-interference and noise ratio (SINR), a carrier-to-interference and noise ratio (CINR), a signal-to-noise ratio (SNR), an error vector magnitude (EVM), a bit error rate (BER), and a block error rate (BLER). The terminal 520, based on the channel quality of each beam, may identify an optimal beam among the beams. The optimal beam may be referred to as a "preferred beam" or a "best beam". The optimal beam means a beam corresponding to the case in which a measured channel quality value is the maximum (signal magnitude-related channel quality) or the case in which a measured channel quality value is the minimum (error rate-related channel quality).

Hereinafter, a procedure in which the terminal 520 performs a downlink beam search using three beams (e.g., a first beam 511, a second beam 512, and a third beam 513) will be described as an example. The terminal 520 may control a first beam 511, a second beam 512, and a third beam 513 by means of a first index for the first beam 511, a second index for the second beam 512, and a third index for the third beam 513, respectively. The terminal 520 may perform a beam search while changing the beam in the order of the first beam 511, the second beam 512, and the third beam 513. The terminal 520 may perform a beam search by changing beam configuration in the order of the first index, the second index, and the third index.

Movement may occur in the terminal 520 while the terminal 520 searches for a beam with respect to the base station (for example, when the terminal 520 performs a beam search procedure while changing the beam of the terminal 520, or when the terminal 520 receives signals from the base station via a specific beam). As the terminal 520 moves, the actual direction of the beam formed by the terminal 520 may vary. In the case where the terminal 520 manages the beam using an index, the terminal cannot track the direction of the actually formed beam with the movement of the terminal. Thus, it may be difficult to use a beam that terminal 520 wishes to use (or a beam this is intended to be used).

The terminal 520 may receive signals through the first beam 511 for a transmission beam search. During a first time interval 531, the terminal 520 may receive a signal through the first beam 511 in a first direction 551. The terminal 520 may move during the beam search for the first beam 511. As the terminal 520 moves, the direction in which the first beam 511 is oriented may be changed from the first direction 551 to a third direction 553. In accordance with the ongoing communication procedure of the terminal 520, the terminal 520 may wish to maintain the direction of the signal through the first beam 511. For example, the terminal 520 may receive reference signals transmitted from the base station in different beam directions for a downlink transmission beam search of the base station. The terminal 520 needs to receive the signals in the same direction in order to measure the channel quality for the respective beams of the base station. If the terminal 520 is moved and thus the beam direction of the terminal changes, it may be difficult to compare the quality between the respective beams of the base station. Thus, the terminal 520 according to various embodiments obtains information on the direction in which the first beam 511 is actually oriented (hereinafter, referred to as "direction information"), instead of a first index for the first beam 511, in order to sustain beamforming in a specific direction (e.g., the first direction 551) even when the terminal moves.

For a reception beam search, the terminal 520 may be scheduled to receive signals through the first beam 511 in a first time interval 531, through the second beam 512 in a second time interval 532, and through the third beam 513 in a third time interval 533. The procedure of varying the beam for each time interval is intended to search for beams in multiple directions, thereby identifying an optimal reception beam. The terminal 520 may perform a beam search through the first beam 511 in the first time interval 531. The terminal 520 may receive a signal through the first beam 511. The terminal 520 may measure the channel quality for the signal of the first beam 511. At this time, the first beam 511 is oriented in the first direction 551. Afterwards, the terminal 520 may change the beam in order to perform a beam search through the second beam 512. The terminal 520 may change beam configuration from the first beam 511 to the second beam 512 for beam search. The terminal 520 may change a beam index from a first index to a second index. The terminal 520 may change the beam configuration to the second beam 512 in order to perform a search in the second direction 552.

The terminal 520 may move before the terminal 520 changes the beam configuration to the second beam 512. As the movement occurs, the direction in which the second beam 512 is oriented may be changed from the second direction 552 to the first direction 551. When the terminal 520 changes the beam index from the first index to the second index, the terminal 520 may perform a beam search in the first direction 551. That is, the terminal 520 may duplicate a beam search in the first direction 551, so that resources allocated for beam search through the second beam 512 may be wasted. The beam search through the second beam 512, which is performed without consideration of the direction, may bring about the same or a similar search result because the previously searched direction is the same as the direction to be searched through the second beam 512. Accordingly, the terminal 520 is required to search for beams in other directions during the second time interval 532. The terminal 520, according to various embodiments, may obtain information on the directions of the operated beams (hereinafter, referred to as "direction information"), instead of changing the index, for beam search in multiple directions, and, based on the obtained direction information, may perform a beam search. For example, the terminal 520 may perform a beam search on the third beam 513 oriented in the second direction 552 rather than the first direction 551 in which the search has previously been performed. The terminal 520 may change the beam to be searched from the first beam 511 to the third beam 553, instead of changing the bean from the first beam 511 to the second beam 512.

As described above, if the direction indicated by the actual beam is not considered in the beam search (for example, when only the beam index is used), there may be a problem that the efficiency of the beam search is degraded depending on the movement of the terminal. In order to improve the efficiency of the beam search, the terminal according to various embodiments may obtain information on the direction in which the beam is actually radiated and information for obtaining the radiation direction (e.g., information measured by a sensor or reception information) when performing a beam search (or when performing a direction search), and may adaptively change the beam index, thereby efficiently performing the beam search procedure. In addition, in all of the procedures for operating one or more beams, such as downlink/uplink communications through an optimal beam, as well as in the beam search procedure, the terminal according to various embodiments can efficiently perform beamforming by considering direction information on the beam depending on the movement of the terminal. The terminal may perform beamforming in accordance with the purpose by simply changing the information operated for beamforming from a beam domain to a direction domain.

Figure 6:
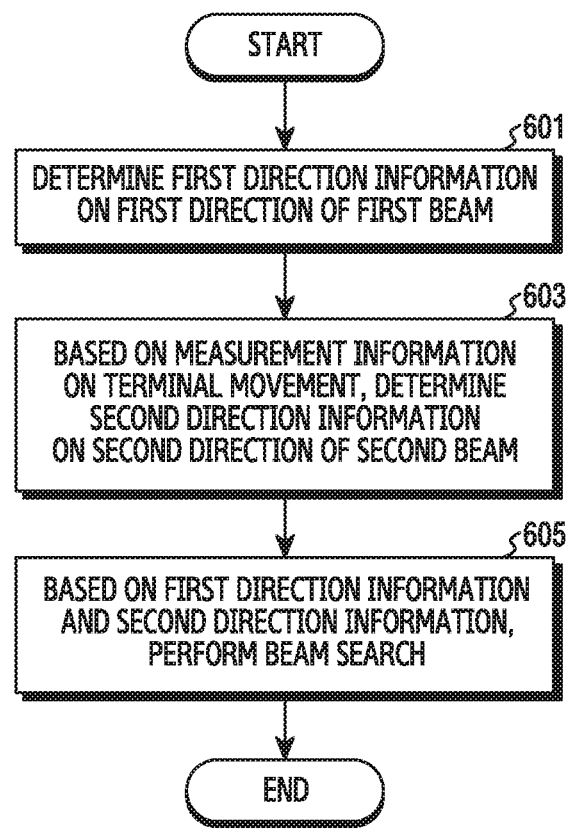
FIG. 6 illustrates a flowchart for the operation of a terminal that performs directivity control according to various embodiments of the disclosure.

FIG. 6 illustrates a flowchart for the operation of a terminal that performs directivity control according to various embodiments of the disclosure. The terminal 120 (or the terminal 130) in FIG. 1 will be illustrated as a terminal.

Referring to FIG. 6, the terminal may determine first direction information on a first direction of a first beam in operation 601. Here, the direction means a bearing at which the beam is oriented. The terminal may determine the first direction information on the first direction of the first beam before the terminal moves. Even if the terminal moves, the terminal can identify the first beam through the index indicating the first beam, but the direction in which the first beam is oriented changes. Thus, the terminal may determine the first direction information for identifying the first current direction of the first beam.

The terminal may use a sensor in order to determine the direction of the beam. The terminal may use the sensor in order to determine the direction of the beam even if the terminal moves. The terminal may set a reference sensor value for the sensor in order to determine the direction of the beam. In some embodiments, the terminal may set a reference beam, and may determine, as a reference sensor value, a measured value of the sensor at the time at which the reference beam is set. The terminal may obtain a measured value of the sensor, and may then determine the amount of change from the set reference sensor value and the obtained measured value even if the terminal moves. In other words, the terminal may obtain the difference between the actual direction of an operating beam and a targeted direction (hereinafter, referred to as a "target direction"). For example, the terminal may obtain a directional change from the amount of change in the measured value provided by a gyro-sensor. In some other embodiments, the terminal may set a reference sensor value using absolute information. For example, the terminal may set an absolute direction (e.g., a geomagnetic north pole) as a reference sensor value through a geomagnetic sensor. The terminal may compare a first difference value between a reference sensor value and a value of the direction of the beam before the terminal moves with a second difference value between the reference sensor value and a value of the direction of the beam after the terminal moves, thereby obtaining a directional variation.

The terminal may obtain first direction information on the first direction of the first beam when performing a beam search for the first beam. In some embodiments, the terminal may perform a transmission beam search of the base station through the first beam of the terminal. The terminal may receive reference signals, which are transmitted from the base station by different transmission beams, respectively, through the first beam, which is a downlink reception beam. The terminal may obtain first direction information on the first direction of the first beam when performing the downlink transmission beam search through the first beam. In some other embodiments, the terminal may perform a reception beam search of the terminal for multiple beams of the terminal. The terminal may receive signals transmitted from the base station through the first beam in a predetermined order. The terminal may determine first direction information on the first direction, which has been searched. In some embodiments, the terminal may store the search result for the first direction in association with the first direction information. Thereafter, the terminal may change the beam in order to perform a beam search by means of the second beam.

The terminal may move while the terminal receives some of the reference signals through the first beam in the transmission beam search procedure of the base station or during the beam search procedure such as the case where the terminal wishes to receive signals by means of the second beam in the reception beam search procedure of the terminal. The sensor may measure the movement of the terminal. When the terminal moves, a measured value of the sensor varies before and after the time of movement.

In operation 603, based on measurement information on the movement, the terminal may determine second direction information on the second direction of the second beam. Here, the movement means a change in the state of the terminal, such as rotating, moving, or tilting of the terminal, in a three-dimensional space.

The terminal may measure the movement of the terminal through at least one sensor. The at least one sensor may be a sensor (e.g., a gyro-sensor, an acceleration sensor, and the like) that measures information related to the movement of the terminal. In some embodiments, the terminal may utilize a gyro-sensor. The gyro-sensor measures an angular velocity of the movement of the terminal, thereby determining measured values related to the rotational movement. In some embodiments, the terminal may utilize an acceleration sensor. The acceleration sensor measures acceleration in the directions of three axes (e.g., x, y, and z-axis) for the movement of the terminal in a three-dimensional space, thereby determining measured values in relation to the linear movement.

The terminal may obtain measurement information from at least one sensor. The terminal may determine a quantitative value for identifying the beam in response to the directional change due to the movement from the measured values included in the measurement information. For example, the terminal may determine an attitude parameter. The terminal may determine physical quantities representing the attitude of the terminal through the measured values. For example, the terminal may determine physical quantities represented by roll, pitch, and yaw using an angle of the terminal. The terminal, based on the physical quantities, may determine an attitude parameter indicating variation.

The terminal may determine the difference between a value (e.g., the attitude parameter) calculated from the measurement information and the reference sensor value set in operation 601. The terminal may determine the difference between the direction of the second beam before the occurrence of the movement and the second direction, which is the direction of the second beam after the occurrence of the movement, according to the difference value. Based on the direction information of the second beam before the terminal moves and the difference value, the terminal may determine the second direction.

The terminal is required to maintain the first direction of the first beam in the reference direction in order to provide feedback on the beams of the base station when performing the transmission beams search of the base station. When the terminal moves, the direction of the first beam may be no longer the reference direction (the first direction). Thus, the terminal may determine whether or not the direction of another beam corresponds to the reference direction. The terminal may determine whether or not the second direction of the second beam is the reference direction.

The terminal may perform a reception beam search of the terminal for multiple beams of the terminal. As described above in operation 601, the terminal may perform a beam search through the first beam in a predetermined order, and then may change the beam in order to perform a beam search through the second beam. The terminal may perform a beam search using the second beam for directivity diversity. The terminal may detect that the direction of the second beam has been changed from the existing direction to the second direction with the movement of the terminal. For directivity diversity, which is the purpose of the terminal beam search, the terminal needs to determine whether or not the second direction is different from the first direction. Thus, the terminal may determine the second direction for the second beam.

In operation 605, the terminal, based on the first direction information and the second direction information, may perform a beam search. Hereinafter, in the disclosure, an effective range will be used to determine the identity between the beams. The effective range means a range within a predetermined angle in a specific direction. In other words, the effective range means a rotation allowance range in a specific direction. For example, the effective range of the first direction may include directions within a rotational range of 3 degrees. The beams within the effective range of a specific direction may perform a beamforming function the same as or similar to the beam in the specific direction. In some embodiments, the terminal may set the effective range according to the width of an operating beam. For example, as the width of a beam operated in the terminal increases, the effective range may be set be larger. This is due to the fact that as the beam width increases, the area covered by a single beam increases and the number of beams required to cover a specific area is reduced. As the number of beams is reduced, the granularity for determining the identity is reduced, so that the effective range may increase.

The terminal may determine whether or not the second direction falls within the effective range of the first direction. In the case where the terminal wishes to maintain directivity (directivity fixation) (e.g., the transmission beam search of the base station), if the second direction does not fall within the effective range of the first direction, the terminal may identify another beam rather than the second beam. This is due to the fact that the reception beam of the terminal is required to be maintained (or fixed) to be the same because the reference signals transmitted from the base station are transmitted by other transmission beams. The terminal may identify another beam in the effective range of the first direction. In some embodiments, after the movement, the terminal may determine the directions of respective operating beams, and may determine whether or not they belong to the effective range of the first direction. Here, the first direction means the direction to be maintained (or fixed) for a beam search. For example, the terminal may determine that the second direction belongs to the effective range of the first direction.

In the case where the terminal wishes to increase the directivity diversity (e.g. a reception beam search in downlink beamforming), if the second direction belongs to the effective range of the first direction, the terminal may identify another beam rather than the second beam, because a beam search in the second direction is not different from a beam search in the first direction in terms of beamforming function. The terminal may identify another beam out of the effective range of the first direction. In some embodiments, the terminal may change the index according to the order for beam search, and may sequentially determine whether or not the direction of a beam corresponding to the index belongs to the effective range of the first direction. Here, the first direction means the direction in which a beam search has already been performed in the corresponding direction. The terminal may store channel quality information (e.g., RSRP) on the first direction.

If the second beam meets the purpose of beam search, the terminal may perform a beam search through the second beam. However, if another beam is identified because the second beam does not meet the purpose of beam search, the terminal may perform a beam search through another identified beam.

As described above, the terminal may obtain information on the direction of the beam in consideration of the state of the terminal in a space, and, based on the direction, may perform a beam search, instead of performing a beam search by simply changing the index of the beam, thereby efficiently performing the beam search. That is, the disclosure describes a procedure for performing a beam search in consideration of direction information in order for an efficient beam search. The procedures according to various embodiments of the disclosure may be referred to as "direction search", "direction sweeping", or "direction training", in addition to "beam search".

Hereinafter, examples for performing directivity control according to various embodiments will be described with reference to FIGS. 7 to 13. More specifically, operations for directivity fixation will be described with reference to FIGS. 7 and 8, operations for directivity diversity will be described with reference to FIGS. 9 to 11, and operations for compensating for the direction of a communication beam will be described with reference to FIGS. 12 and 13.

Beam Search of Base Station (Directivity Fixation)

Figure 7:
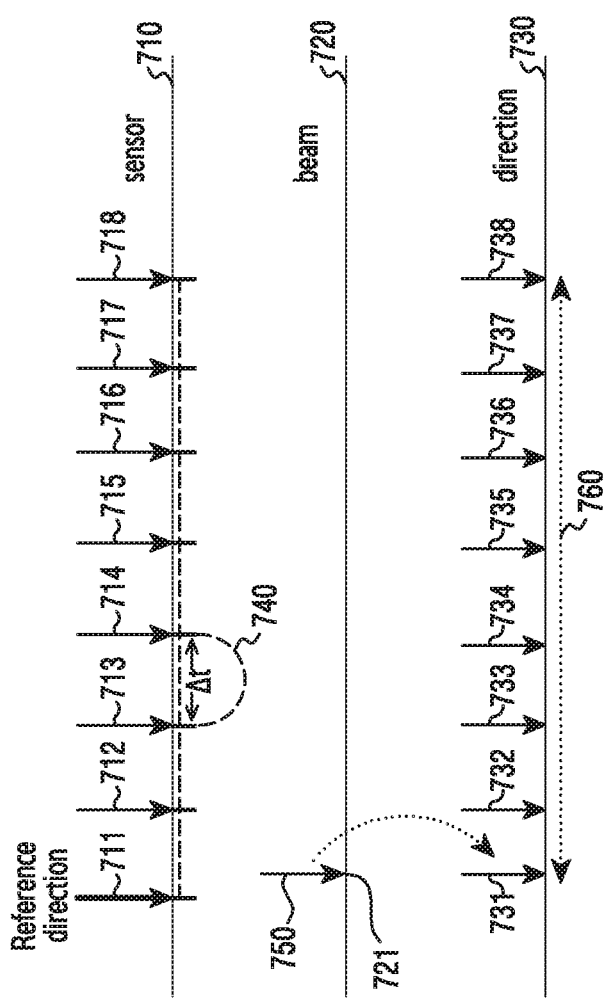
FIG. 7 illustrates directivity control for beam search of a base station according to various embodiments of the disclosure.

FIG. 7 illustrates an example of directivity control for beam search of a base station according to various embodiments of the disclosure. Hereinafter, the base station 110 of FIG. 1 will be illustrated as an example of a base station, and the terminal 120 (or the terminal 130) of FIG. 1 will be illustrated as an example of a terminal.

Referring to FIG. 7, an axis 710 represents a time domain for a sensor that measures the movement of a terminal. For example, the sensor may be a gyro-sensor. As another example, the sensor may be an acceleration sensor. As another example, the sensor may be a grip sensor. The following description of FIG. 7 will be made based on a single sensor, but the description may be applied to a plurality of sensors. An obtaining period or a measurement period, which will be described later, may be differently or commonly applied to a plurality of sensors.

In order to monitor the state related to the movement of the terminal, such as the state of the terminal in a three-dimensional space, determination on the linear movement or rotational movement of the terminal, or the like, the terminal may measure the movement of the terminal through a sensor, and may obtain measurement information from the sensor. The sensor may periodically measure and record the state in relation to the movement of the terminal. The sensor may periodically provide measurement information to a processor in the terminal. The period in which the sensor measures the state (hereinafter, referred to as a "measurement period") may be different from the period in which the terminal obtains a sensor value (hereinafter, referred to as an "obtaining period"). Afterwards, the terminal may periodically make a request to the sensor for the measured information, or the sensor may report the measured information to the terminal according to a period set by the terminal. In some embodiments, the measurement period of the sensor may be shorter than the obtaining period. Thus, the terminal may determine the latest state of the terminal since the time of obtaining the same.

The terminal may set the obtaining period (or reporting period). In some embodiments, based on an interval at which the signals are transmitted from the base station, the terminal may set the obtaining period. Since the signals are transmitted by means of different beams from the base station, the terminal may set the obtaining period below the interval in order to distinguish the signals. For example, the interval may be at least one symbol.

The terminal may obtain measurement information every predetermined period (e.g., the reporting period 740). For example, the terminal may sequentially obtain first measurement information at a time 711, second measurement information at a time 712, third measurement information at a time 713, fourth measurement information at a time 714, fifth measurement information at a time 715, sixth measurement information at a time 716, seventh measurement information at a time 717, and eighth measurement information at a time 718.

The terminal may obtain measurement information whenever an event occurs. In some embodiments, when a sensor in the terminal detects more than a predetermined range of movement, the sensor may notify the processor in the terminal of the detection result. The terminal may make a request for measurement information to the sensor when receiving the detection result. In some other embodiments, the terminal may obtain measurement information whenever the beam is changed. The terminal may further obtain measurement information from the sensor in order to calculate a more accurate direction.

An axis 720 represents a time domain for a reception beam configuration of the terminal. The base station transmits a plurality of reference signals to the terminal for a downlink transmission beam search. The plurality of reference signals is transmitted through a plurality of transmission beams, which have different directions. The terminal may receive the reference signals according to resources (e.g., a subframe, a slot, or the like) allocated from the base station. The reference signals are transmitted for measuring the quality of the transmission beam of the base station. The terminal may set the reception beams in order to measure the quality of the reference signals. For example, the terminal may set a reception beam 750 in order to measure the channel quality of each of the reference signals transmitted in different directions.

The terminal may set a beamforming unit so as to form the reception beam 750. The terminal may set the beamforming unit so as to receive the reference signals in the direction indicated by the reception beam 750. Meanwhile, if the terminal does not compensate for a change in the direction due to the movement of the terminal, such as the axis 720, the channel quality measurement results for the reference signals may not meet the purpose of the transmission beam measurement. The terminal is required to compensate for the direction {that is, to maintain (fix) the directivity} using the measurement information provided periodically.

An axis 730 represents a time domain for directivity fixation. The terminal may perform operations for the directivity fixation during an interval 760. The terminal may receive signals from the base station during the interval 760. The interval 760 may be allocated by the base station in order to measure the quality of the beams of the base station. The terminal obtains information on the direction of the reception beam 750 at the time 721 of setting the reception beam 750 (that is, at the time 731). In addition, the terminal may set a reference sensor value at the time of setting the reception beam 750. In some embodiments, the terminal may set, as a reference sensor value, a measured value indicated by the most recently reported measurement information. For example, the terminal may set a measured value indicated by the first measurement information as a reference sensor value. In some other embodiments, unlike that shown in FIG. 7, the terminal may set, as a reference sensor value, a measured value indicated by the second measurement information reported immediately after setting the reception beam 750. Hereinafter, for the convenience of description, the following description will be made on the basis of the case where the first measurement information is set as a reference sensor value.

Thereafter, as seen by the axis 710, whenever measurement information is reported, the terminal, based on the reported measurement information, fixes the direction. Here, the fixed direction is a direction indicated by the reception beam 750 set at the time 721, which will be referred to as a "reference direction" hereinafter. More specifically, whenever the measurement information is reported, the terminal, based on the reported measurement information, determines whether or not the current beam direction falls within the effective range of the reference direction. Whenever the measurement information is reported, the terminal may calculate the direction of the currently set beam, thereby determining whether or not the direction of the beam falls within the effective range, or, based on the amount of change included in the measurement information, may determine whether or not the direction of the beam falls within the effective range.

When the second measurement information is reported, the terminal determines whether or not the currently set beam direction falls within the effective range of the reference direction at the time 732. The terminal, based on the reference sensor value and the second measurement information, may determine whether or not the direction indicated by the currently set reception beam 750 falls within the effective range of the reference direction. If the direction indicated by the reception beam 750 is out of the effective range at the time 732, the terminal may identify a beam belonging to the effective range. The terminal may determine the directions of the operating beams, and may identify a beam having a direction belonging to the effective range of the reference direction, among the determined directions. Then, the beam index is changed to the beam identified in the reception beam 750 (that is, the setting of the beamforming unit is changed), thereby maintaining the beamforming direction within the effective range of the reference direction. However, if the direction indicated by the reception beam 750 falls within the effective range at the time 732, the terminal may perform a beam search procedure while maintaining the reception beam 750.

When the third measurement information is reported, the terminal determines whether or not the direction of the currently set beam falls within the effective range of the reference direction at the time 733. Like that at the time 732, it may be determined whether or not the direction of the currently set beam changes with the movement of the terminal. When the fourth measurement information is reported, the terminal determines whether or not the currently set beam direction falls within the effective range of the reference direction at the time 734. When the fifth measurement information is reported, the terminal determines whether or not the currently set beam direction falls within the effective range of the reference direction at the time 735. When the sixth measurement information is reported, the terminal determines whether or not the currently set beam direction falls within the effective range of the reference direction at the time 736. When the seventh measurement information is reported, the terminal determines whether or not the currently set beam direction falls within the effective range of the reference direction at the time 737. When the eighth measurement information is reported, the terminal determines whether or not the currently set beam direction falls within the effective range of the reference direction at the time 738.

Figure 8:
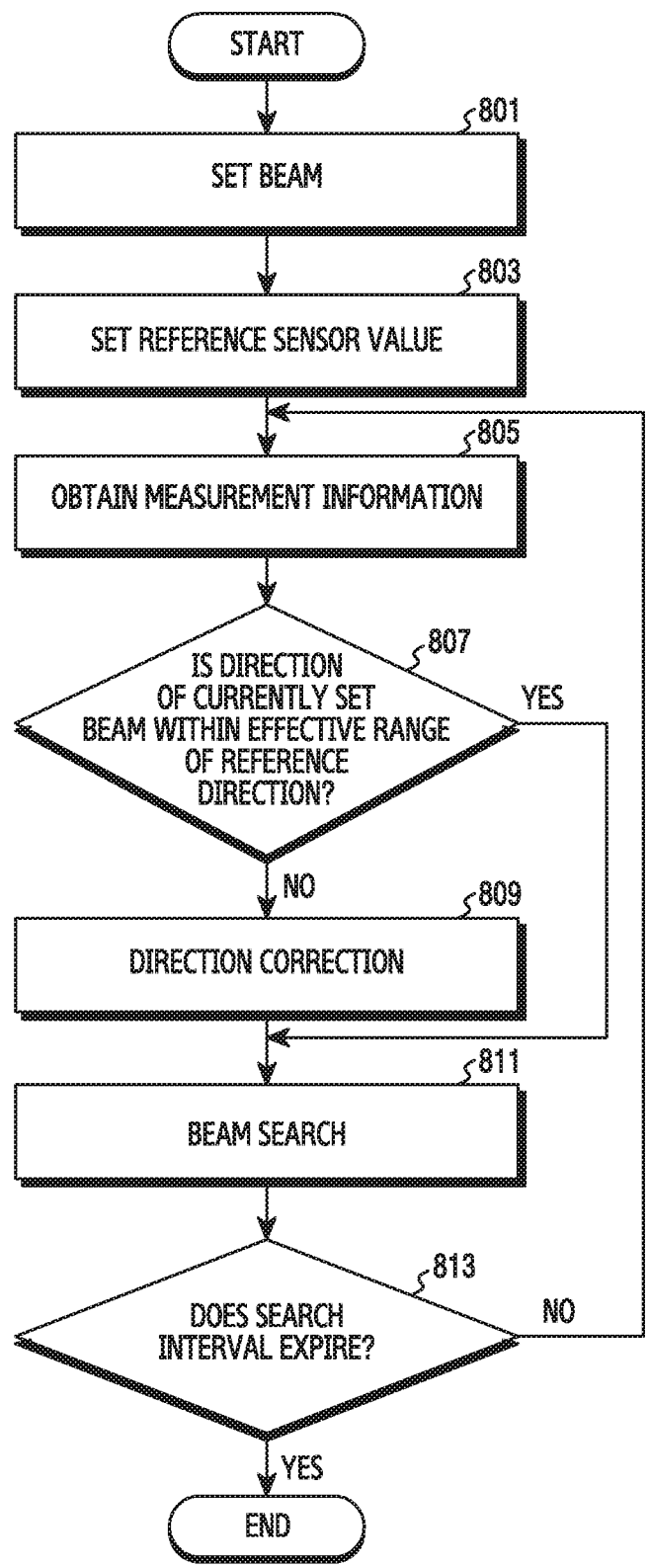
FIG. 8 illustrates a flowchart for the operation of a terminal that performs directivity control for beam search of a base station according to various embodiments of the disclosure.

FIG. 8 illustrates a flowchart for the operation of a terminal that performs directivity control for beam search of a base station according to various embodiments of the disclosure. The terminal 120 (or the terminal 130) of FIG. 1 will be illustrated as an example of a terminal.

Referring to FIG. 8, the terminal may set a beam in operation 801. The terminal may set a reception beam in order to receive signals transmitted from the base station. The direction indicated by the set beam is a direction in which the terminal wishes to perform a search, which will be referred to as a "reference direction" or a "search direction" hereinafter. The terminal is required to receive signals from the base station while maintaining the search direction. Thus, the terminal may use sensor information in order to maintain the search direction.

In operation 803, the terminal may set a reference sensor value. The terminal may set, as a reference sensor value, a measured value at the time close to the time of setting the beam. In other words, when setting a reference sensor value, the terminal may set a most recently obtained measured value as a reference sensor value. The terminal may set a reference sensor value to correspond to the reference direction.

In operation 805, the terminal may obtain measurement information. The terminal may obtain measurement information periodically. The terminal may obtain measurement information every predetermined period. In some embodiments, the period may be set to be shorter than a resource interval in which one of the signals transmitted from the base station is transmitted. This is due to the fact that the reference direction must be maintained by compensating for the movement of the terminal through the measurement information while the transmission beam of the base station is changed. The terminal may obtain measurement information from the sensor until the search interval (e.g., the interval 760 in FIG. 7) expires in operation 813, which will be described later. The terminal may perform operation 807 in response to the obtaining of the measurement information.

In operation 807, the terminal may determine whether or not the direction of the currently set beam falls within the effective range of the reference direction. When the terminal receives the measurement information, the terminal may re-determine the direction of the currently set beam. For example, if the terminal is tilted by 30 degrees in the clockwise direction after operation 803, there may be a difference between the direction of the beam in operation 801 and the direction of the current beam. Accordingly, the terminal may re-determine the direction of the currently set beam (the beam set in operation 801) in order to compensate for the difference. For example, the terminal may determine the degree of movement of the terminal (the amount of change in the direction of the beam) from the reference sensor value and the measurement information.

The terminal may determine whether or not the determined direction of the beam falls within the effective range of the reference direction. In other words, the terminal may determine whether or not the direction of the current beam is maintained within a predetermined range of the reference direction. If the direction of the currently set beam is within the effective range of the reference direction, the terminal may perform operation 811 without going through operation 809. However, if the direction of the currently set beam is out of the effective range of the reference direction, the terminal may perform operation 809.

The terminal may perform direction correction in operation 809. The terminal may identify a beam the direction of which according to the current state of the terminal falls within the effective range of the reference direction, among a plurality of beams (e.g., 39 beams) that can be operated by the terminal. In some embodiments, the terminal may calculate the directions for the respective beams, and may determine whether or not the calculated directions fall within the effective range of the reference direction. Afterwards, the terminal may identify the beams corresponding to the directions belonging to the effective range of the reference direction. In some other embodiments, the terminal may calculate only the directions of some beams adjacent to the currently set beam, instead of calculating the directions of all beams. The terminal may calculate the directions of some beams, thereby identifying beams located within the effective range of the reference direction, among some of the beams. The terminal performs calculation for some of the beams, instead of calculation for all of the beams, thereby reducing computational complexity. In this case, the terminal may store information on the respective directions of the beams, which are in operation in the terminal. For example, the terminal may pre-store a table of vector information (e.g., radiation angles) on the respective beams. The terminal may maintain the beamforming direction as the reference direction by setting the beamforming unit through the identified beam. More specifically, the terminal may change the index of a predetermined beam to the index of the identified beam, and may perform beamforming through the beamforming parameters corresponding to the changed index.

In operation 811, the terminal may perform a beam search. The terminal may receive signals from the base station while maintaining the direction. The signals may be signals transmitted from the base station by means of different transmission beams. The signals may be, for example, synchronization signals. As another example, the signals may be reference signals.

In operation 813, the terminal may determine whether or not the search interval has expired. Here, the search interval may be a time allocated to the terminal by the base station for selection of the transmission beam. In other words, the search interval may be a time for channel quality measurement for a plurality of transmission beams of the base station with respect to a specific direction of the terminal (e.g., the reference direction or the search direction in operation 801). For example, the search interval may be at least one subframe. In this case, at least one subframe may be referred to as a "synchronization subframe". As another example, the search interval may be at least one slot.

If the search interval has not expired, the terminal may return to operation 805 so as to receive the measurement information again. Thereafter, the terminal repeats operations 807 to 813. If the search interval has expired, the terminal terminates the beam search procedure of the base station for the search direction.

Although the reference sensor value is determined after setting the beam in FIG. 8, the disclosure is not limited thereto. In some embodiments, the terminal may set the reference sensor value first, and may then set a beam for the search direction. This is due to the fact that the terminal can compensate for the movement of the terminal through the relative beam direction difference. Even if the terminal moves before setting the search beam after setting the reference sensor value, the relative angle difference between the beams does not vary. Therefore, the search direction can be maintained while controlling the beams. Operation 803 may be performed prior to operation 801.

Although it is not shown in FIG. 8, the terminal may identify an optimal combination of the beam of the terminal and the beam of the base station while further changing the set beams of the terminal. The terminal may perform the operations shown in FIG. 8 for each beam of the terminal, thereby efficiently searching for an optimal beam pair. At this time, it should be noted that the direction of the beam changes with the movement of the terminal even when the beam set in the terminal is changed and searched for. Now, a beam search procedure for directivity diversity considering diversity of the beam direction will be described with reference to FIGS. 9 to 11.

Beam Search of Terminal (Directivity Diversity)

Figure 9:
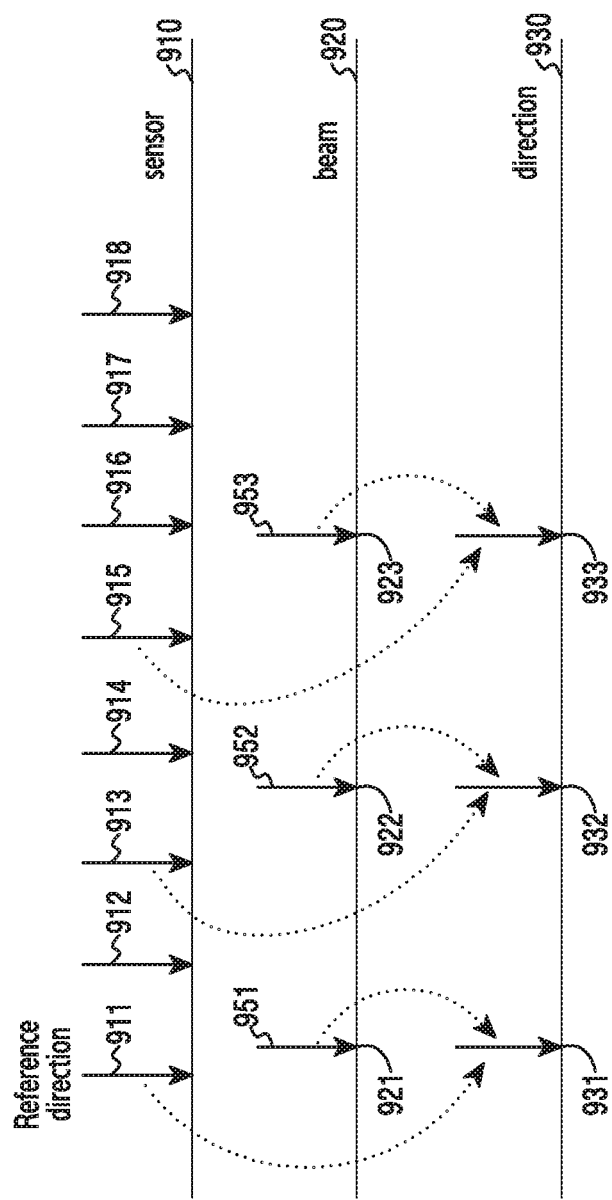
FIG. 9 illustrates directivity control for a beam search of a terminal according to various embodiments of the disclosure.

FIG. 9 illustrates an example of directivity control for beam search of a terminal according to various embodiments of the disclosure. Hereinafter, the base station 110 of FIG. 1 will be illustrated as an example of a base station, and the terminal 120 (or the terminal 130) of FIG. 1 will be illustrated as an example of a terminal. Although a beam search procedure for downlink communication will be described as an example hereinafter, the disclosure is not limited thereto. The operations described below can be applied to all procedures using uplink communication, inter-terminal communication, and other beams.

Referring to FIG. 9, an axis 910 represents a time domain for a sensor that measures the movement of a terminal. The terminal may obtain measurement information every predetermined period. For example, the terminal may sequentially obtain first measurement information at a time 911, second measurement information at a time 912, third measurement information at a time 913, fourth measurement information at a time 914, fifth measurement information at a time 915, sixth measurement information at a time 916, seventh measurement information at a time 917, and eighth measurement information at a time 918.

An axis 920 represents a time domain for a reception beam configuration of the terminal. The base station transmits a plurality of signals to the terminal. The terminal may receive signals by means of different reception beams according to resources (e.g., subframes, slots, or the like) allocated by the base station. The terminal may set reception beams in order to measure the channel quality of respective reception beams. The terminal may perform reception beam sweeping. For example, the terminal may change the beam to a first beam 921 at a time 951, to a second beam 922 at a time 952, and to a third beam 923 at a time 953 in sequence.

An axis 930 represents a time domain for directivity diversity. The terminal obtains direction information on a set beam whenever the reception beam is set.

The terminal may set a reference sensor value in order to obtain the amount of change in the direction corresponding to the movement thereof. The terminal may set, as a reference sensor value, a measured value indicated by the most recently obtained measurement information when setting a beam in the reference direction. For example, when setting an initial reception beam, which is a reference for the reception beam search procedure, the terminal may set a value of the most recently reported measurement information as a reference sensor value.

Figure 14:
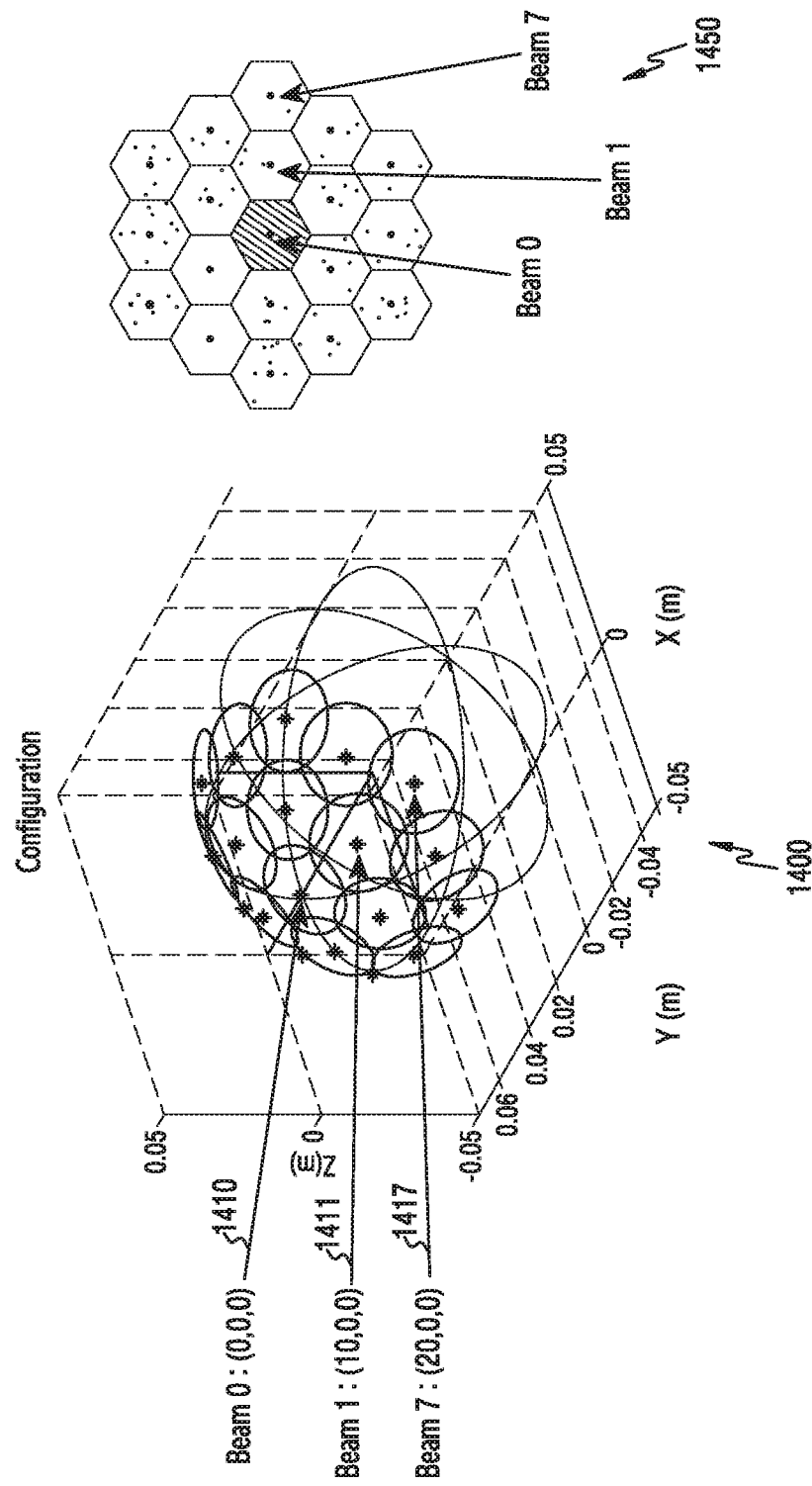
FIG. 14 illustrates mapping the movement of a terminal with beam indices according to various embodiments of the disclosure.

The terminal may determine the amount of change in the beam direction through the amount of change in the sensor with respect to the reference sensor value whenever the terminal moves. In addition, whenever the terminal changes the beam for a reception beam search, the terminal may determine the movement of the terminal and the amount of change in the beam direction through the difference between an expected value of the sensor from the reference sensor value and a measured value of the sensor obtained from actual measurement information. In some embodiments, the expected value of the sensor may be obtained through a difference value between parameters indicating the directions of the respective beams at a position relative to the terminal. The terminal may store the parameters. For example, the parameter may be a beam distance representing a direction difference between a specific beam and another beam as shown in FIG. 14.

When setting a first beam, the terminal determines first direction information for the first direction of the first beam at a time 931. The terminal determines the first direction information using the first measurement information, which has been most recently obtained (at the time 911) since the time 931. The terminal may perform a beam search for the first beam. The terminal may receive a signal from the base station through the first beam. The terminal may perform a search for the first beam, and may then store the first direction information on the first direction of the first beam. The terminal may store the search result of the first beam corresponding to the first direction information. The terminal may include the first direction in a search set. The search set includes directions in which the search has been performed. It should be noted that this is not a set of beams but a set of directions. The search set may be referred to as a "direction set".

When setting the second beam, the terminal determines the second direction for the second beam at a time 932. The terminal determines the second direction using the third measurement information, which is most recently obtained (at the time 913) since the time 932. In order to determine whether or not to perform a beam search for the second beam, the terminal may determine whether or not the second direction belongs to the search set. If the second direction belongs to the effective range of the first direction in the search set, the terminal may determine that the second direction belongs to the search set. The terminal may not perform a beam search for the second direction, because it is predicted that, even if a beam search for the second direction is performed, the result thereof is similar to that of the first beam search.

Since the base station allocates resources for beam search to the terminal for a predetermined period of time, if the terminal does not perform a beam search through the second beam, the resources will be wasted. In some embodiments, the terminal may identify another beam having a direction that is out of the effective range of the first direction during the corresponding resource interval. This is due to the fact that, if the terminal has N operable beams, the terminal may transmit and receive signals in N directions. Although it is not shown in FIG. 9, whenever directions overlap each other during the time allocated for the N beams (in the case where the directions overlap each other in the effective range), the terminal may perform a search procedure by changing the beam, thereby obtaining search results for the N beams. When the terminal performs a beam search in the direction of another identified beam (i.e., the direction out of the effective range of the first direction), the terminal may include the direction of another identified beam in the search set. In some other embodiments, the terminal may not receive a reference signal during the corresponding resource interval. The terminal may operate in a low-power mode. Since a receiving operation or a measuring operation is not required during the corresponding interval, the terminal may turn off some of the transceiver or processor.

The terminal determines a third direction for the third beam at a time 933, when setting the third beam after the time allocated for the second beam has elapsed. The terminal determines the third direction using the fifth measurement information, which has been most recently obtained (at the time 915) since the time 933. Like the second direction, the terminal may determine whether or not the third direction belongs to the search set.

The procedure of the terminal for sequentially changing the direction in consideration of directivity diversity, instead of simply changing the index of beam sequentially, has been described with reference to FIG. 9. Although it is not shown in FIG. 9, in some embodiments, the terminal may further perform a beam search procedure (e.g. a complement beam search and an extended beam search) in terms of resource efficiency and directional diversity.

The terminal may perform a complement beam search. When the terminal is moved and the beam search procedure for the corresponding beam is changed as described above, the terminal may perform a complement beam search. In order to utilize all of the resources allocated to the terminal, the base station may perform a search for the beam that is oriented in the unsearched direction. For example, in the case where three terminal beams are operated as shown in FIG. 5, it is assumed that the terminal moves after beam-searching for the first beam. The direction of the second beam (the first direction 551) may be the same as the direction of the first beam. The terminal may perform a beam search procedure (the second direction 552) for the third beam. However, although a beam search interval is allocated to the terminal for three reception beams, the terminal has searched only for two beams. Thus, the terminal may perform a beam search for the first beam once more. The terminal may perform a beam search for the first beam in the third direction 553 rather than the previously searched direction.

In addition, even if the terminal has searched for all of the beams for the allocated interval, the terminal may perform an extended beam search because the beam search result for the direction in which the terminal has previously performed a search may no longer be valid after the movement of the terminal. Excluding the previous beam search result means that there are beams that have not yet been searched for, and thus the terminal may perform an extended beam search for the unsearched beams. The procedure for determining whether or not the beam search result is valid according to the movement of the terminal is referred to as "validation decision". In this case, the terminal may make a request for allocation of additional resources to the base station.

Figure 10:
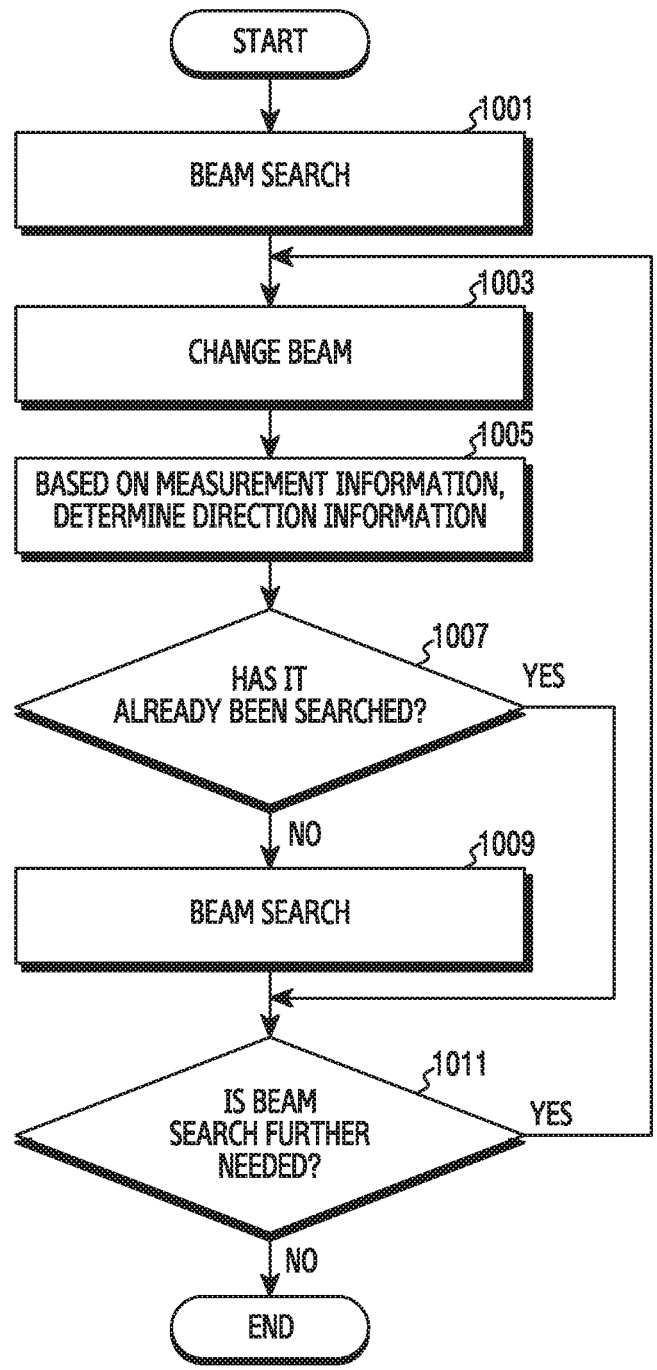
FIG. 10 illustrates a flowchart for the operation of a terminal that performs directivity control for a beam search of a terminal according to various embodiments of the disclosure.

FIG. 10 illustrates a flowchart for the operation of a terminal that performs directivity control for beam search of a terminal according to various embodiments of the disclosure. The terminal 120 (or the terminal 130) in FIG. 1 will be illustrated as an example of a terminal.

Referring to FIG. 10, the terminal may perform a beam search in operation 1001.

The terminal may set a beam for beamforming. For example, the beam to be set may be the beam that is set first when searching for downlink reception beams of the terminal. The terminal may perform a beam search using the currently set beam. The terminal may perform a beam search using the first beam. The terminal may store direction information indicating the first direction of the first beam. The terminal according to various embodiments may store a search result for the first beam so as to correspond to the first direction. The terminal may include the first direction in a search set. Hereinafter, determining, storing, and including the direction may refer to operations of determining direction information indicating direction, storing direction information, or mapping direction information with specific information, respectively. The terminal may identify a beam to be searched for next. For example, the terminal may identify the beam to be changed according to a predefined beam search order with a beam index.

In operation 1003, the terminal may change the beam. The terminal may change the beamforming configuration to the beam identified for the next search in the previous operation. The terminal may change the beamforming configuration to a beam index corresponding to the identified beam. For example, the terminal may change the beamforming configuration from the first beam to the second beam. The terminal may change the beam according to the beam search order. The terminal may set the beam search order in order to measure the signal quality for each of a plurality of directions. The terminal may change the beamforming configuration to the beam identified according to the beam search order. Additionally, in some embodiments, the terminal may identify a beam to be changed according to a complement beam search procedure, which will be described later. An operation of identifying a beam to be searched for in the complement beam search procedure will be described in operation 1105 of FIG. 11. In addition, the terminal may identify a beam to be changed according to an extended beam search procedure, which will be described later. An operation of identifying the beam to be searched for in the additional beam search procedure will be described in operation 1113 of FIG. 11.

In operation 1005, the terminal, based on measurement information, may determine direction information indicating the direction of the changed beam. When changing the beam to the second beam, the terminal, based on the most recently reported or most recently obtained measurement information, may determine direction information on the second direction of the second beam. The measurement information is information on the state of the terminal, and, based on measured values in the measurement information and a reference sensor value, the terminal may obtain the movement of the terminal or the degree of movement of the terminal.

In operation 1007, the terminal may determine whether or not the terminal has searched the direction of the beam indicated by the direction information. The terminal may determine whether or not a beam search procedure for the direction indicated by the direction information in operation 1005 has previously been performed. Here, the previously performed beam search procedure means operation 1001 or operation 1009 described later in the previous cycle. For example, the terminal may determine whether or not a beam search procedure for the second direction has already been performed. The terminal may determine whether or not the second direction belongs to a search set. The search set may include a plurality of directions. The terminal may determine whether or not to perform a search in respective directions through the direction information on the respective directions included in the search set. If the second direction falls within the effective range of at least one of a plurality of directions, the terminal may determine that the second direction belongs to the search set. However, if the second direction does not fall within the effective range of any one of the plurality of directions, the terminal may determine that the second direction does not belong to the search set.

If the beam search procedure for the determined direction has already been performed, the terminal may perform operation 1011. On the other hand, if the beam search procedure for the determined direction has not yet been performed, the terminal may perform operation 1009.

In operation 1009, the terminal may perform a beam search in the determined direction because the determined direction is different from the direction (e.g., the first direction) in which the search has already been performed and is out of the effective range. The terminal may perform a beam search for the changed beam, and may store a search result thereof. The terminal according to various embodiments may store a search result for the beam determined in operation 1003 to correspond to the direction information determined in operation 1005. The terminal may include the direction corresponding to the direction information in the search set.

In some embodiments, the transmission beam search procedure of the base station and the reception beam search procedure of the terminal may be applied simultaneously. For example, the base station may transmit reference signals by changing the transmission beams, the terminal may receive the reference signals through a fixed beam. Thereafter, the terminal may repeat the reception operation of the reference signals by changing only the fixed beam. In this case, the beam search procedure may be performed in operations 1001 and 1009. In other words, the beam search procedure for directivity fixation according to the various embodiments described with reference to FIGS. 7 and 8 may be performed in operations 1001 and 1009.

The beam search procedure for directivity diversity is intended to search for beams in various directions, instead of fixing the beam to a specific direction. Thus, a procedure for determining the direction of the current beam every time the measurement information is reported (or obtained) may not necessarily be required in the beam search procedure for directivity diversity.

In operation 1011, the terminal may determine whether or not to further search for the beam. The terminal may sequentially change the beam in a predetermined order for the reception beam search, thereby performing a search. The terminal may perform a beam search until it reaches the last beam in the predetermined order.

In some embodiments, even when the beam search has been performed on the last beam in the order, the terminal may determine whether or not to perform an additional beam search. For example, in order to use all of the resources allocated by the base station, the terminal may determine whether or not to perform a complement beam search. As another example, in order to increase the accuracy for finding an optimal reception beam, the terminal may determine whether or not to perform an extended beam search. Detailed operations for the additional beam search will be described with reference to FIG. 11.

In some other embodiments, if it is determined that the terminal no longer performs the search procedure, the terminal may terminate the reception beam search. If a measurement result for at least one of the previously searched beams exceeds a threshold value for performing communications, the terminal may determine that it will no longer perform the search procedure. For example, the terminal may no longer perform the search procedure if an RSRP value of at least one of the previously searched beams exceeds a threshold value.

Figure 11:
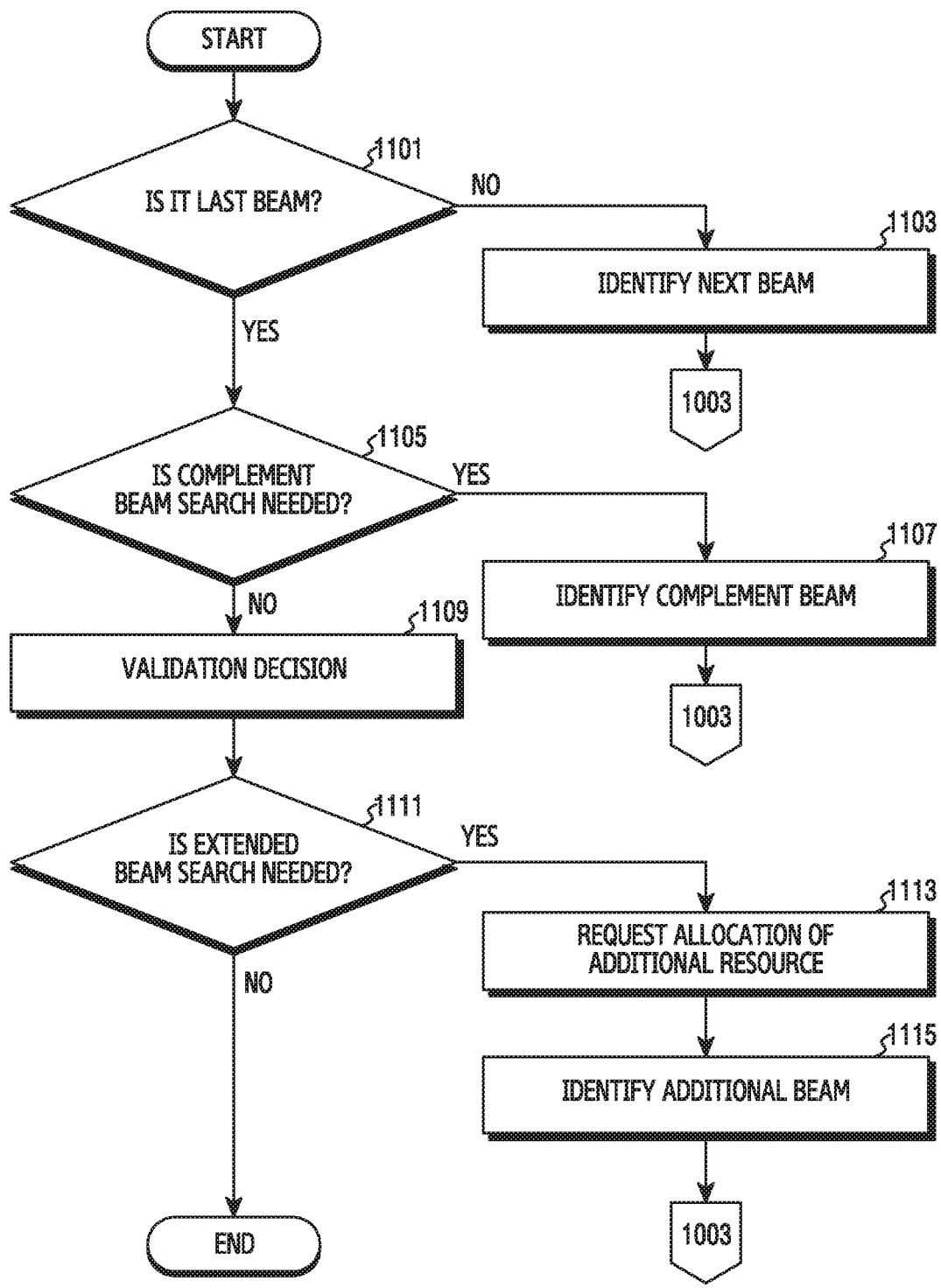
FIG. 11 illustrates a flowchart for the operation of a terminal for a complement beam search and an extended beam search according to various embodiments of the disclosure.

FIG. 11 illustrates a flowchart for the operation of a terminal for a complement beam search and an extended beam search according to various embodiments of the disclosure. The terminal 120 (or the terminal 130) in FIG. 1 will be illustrated as an example for a terminal. FIG. 11 shows detailed operations for operation 1011 in FIG. 10.

Referring to FIG. 11, in operation 1101, the terminal may determine whether or not the beam searched in operation 1009 is the last beam. Here, the last beam means the last beam in a predetermined beam search order. If the beam searched in operation 1009 (i.e., the currently set beam) is not the last beam, the terminal may perform operation 1103. If the set beam is the last beam, the terminal may perform operation 1105.

In operation 1103, the terminal may identify the next beam of the terminal according to a predetermined order. The next beam means a beam to be searched for next by the terminal. For example, if the terminal has searched for a beam 7 in operation 1009, the terminal may identify a beam 8. The terminal may perform operation 1003 in FIG. 10 with the next identified beam.

In operation 1105, the terminal may determine whether or not to perform a complement beam search. Based on the number (k) of previously searched directions and the number (N) of beams allocated for the search in the terminal, the terminal may determine whether or not to perform a complement beam search.

The terminal may compare the number (k) of previously searched directions with the number (N) of beams allocated for the search in the terminal. Here, the number of beams may be a number corresponding to the time for which the base station searches for the beams of the terminal. In some embodiments, the number of beams may correspond to the total number of beams that are in operation in the terminal. In some other embodiments, the number of beams may correspond to the number of some of the beams available in the terminal. At this time, the terminal may perform a beam search procedure on some beams during the procedure of FIGS. 10 and 11.

If the number (k) of previously searched directions is less than the total number (N) of beams operated for searching, the terminal may perform a beam search with another beam in order to increase the efficiency of the allocated resources. That is, the terminal may determine to perform a complement beam search. The terminal may perform operation 1107 for a complement beam search. If the number of previously searched directions is equal to or more than the total number (N) of beams operated for searching, the terminal may perform operation 1109.

In operation 1107, the terminal may identify a complement beam. The complement beam may be a beam corresponding to a searchable or unsearched direction when considering the current position and state of the terminal after searching for all of the beams according to a predetermined beam search order. For example, the complement beam may be a first beam indicating the third direction 533 in FIG. 5. The complement beam indicates the direction for the area that is not covered by a beam sweeping procedure after the movement.

In some embodiments, the terminal may determine the directions for all of the beams operable in the terminal. The terminal may identify at least one direction, among the determined directions, that does not belong to the search set. The terminal may determine the beam corresponding to at least one identified direction as a complement beam.

In some other embodiments, the terminal may identify the beams located at the outermost positions from the center, among all of the operable beams. For example, the terminal may identify the beam 11, the beam 17, the beam 25, the beam 39, and the like in the sectional beam view of FIG. 15. The terminal may determine whether or not the directions of the beams, which are located at the outermost positions, belong to the search set. The terminal may determine the beams that do not belong to the search set, among the beams located at the outermost positions, as complement beams. When identification of the complement beam is further required, the terminal may further identify the complement beam in the order from the outermost beams to the central beam (e.g., the beam 0) in sequence.

The terminal may perform operation 1003 in FIG. 10 using the identified complement beam.

In operation 1109, the terminal may perform a validation decision. If there are directions required to be further searched (or areas that can be covered by the beams corresponding to the directions) according to the movement, or if there are directions (or areas) that have failed to be searched due to a problem of allocated resources even if they need to be searched, the terminal may perform an extended beam search. The terminal may perform a validation decision in order to perform an extended beam search.

If there are N beams that are operable in the terminal, the terminal may perform up to N independent directivity communications. That is, the terminal may perform a search in N directions. In the case where the terminal performs a beam search on "y" directions before the movement of the terminal and performs a beam search on "N-y" directions after the movement of the terminal, the result of the beam search performed on the "y" directions before the movement may not be valid because the beam search result before the movement may correspond to the measurement result for the direction toward an area beyond the coverable beam area after the movement.

In some embodiments, the terminal may perform validation decision on the respective searched directions (N). All of the searched directions may be elements of a search set. The terminal may calculate the directions of the respective beams in operation in the terminal, and may determine the beam coverage according thereto. The terminal may identify the elements of the search set, which are out of the effective area of the beam coverage (an identity range of the beam coverage). In some other embodiments, the terminal may perform validation decision on the directions (y) before the movement, among the searched directions. Among the directions before the movement, the terminal may identify at least one direction that is out of the effective area of the current beam coverage of the terminal.

In operation 1111, the terminal may determine whether or not to perform an extended beam search. The terminal may determine whether or not there is a direction that is excluded from the search set. If there is a direction excluded from the search set, this means that there is a direction that has not been searched in the current terminal state. The terminal may determine whether or not to perform an extended beam search according to the presence or absence of the direction identified in operation 1109. In the case where the terminal performs an extended beam search, the terminal may exclude the direction identified in operation 1109 from the search set. Thereafter, the terminal may perform operation 1113. On the other hand, if there is no direction identified in operation 1109, or if the extended beam search is not performed even when there is a direction identified in operation 1109 (that is, if all of the searched directions are valid), the terminal may terminate the beam search procedure of FIGS. 10 and 11.

In operation 1113, the terminal may make a request to the base station for allocation of additional resources. Although N directions are available for actual beamforming, the terminal may not be able to perform a beam search within the allocated interval for the available directions because of redundancy of search or loss of validity of the search result. Thus, in order to perform an additional beam search (that is, in order to perform an extended beam search), the terminal may make a request to the base station for allocation of additional resources.

In operation 1115, the terminal may identify an additional beam. The terminal may identify the additional beam to perform a search through the resource that has been further allocated according to the request in operation 1113. In some embodiments, the terminal may determine directions for all of the beams operable in the terminal, and may identify at least one direction that does not belong to the search set, among the determined directions. The terminal may determine, as an additional beam, the beam corresponding to at least one identified direction. In some other embodiments, the terminal may identify, among all of the operable beams, beams that are located at the outer (outermost) positions from the center. The terminal may determine, as an additional beam, beams that do not belong to the search set, among the beams located at the outer positions. The terminal may determine the additional beam in a manner similar to the case of the complement beam identified in operation 1107. The terminal, through the allocated resource, may return to operation 1003 to then change the set beam to the identified beam and to thus perform a beam search.

Although operations for the extended beam search have been described through operations 1107 to 1111 in FIG. 11, the terminal according to various embodiments is not limited thereto. In some embodiments, the terminal may not perform an extended beam search. Accordingly, the terminal may not perform operation 1107 or operations 1109 to 1111. If the terminal does not perform operation 1107, and if the terminal does not perform the complement beam search in operation 1105, the beam search procedure for directivity diversity is terminated. In addition, the terminal may perform operation 1107, but may not perform operations 1109 to 1111. If the terminal does not perform operation 1109, the beam search procedure for directivity diversity is terminated after the validation decision.

The beam search procedure has been described with reference to FIGS. 7 to 11. Through the beam search procedure according to various embodiments, the terminal may perform a search procedure that is consistent with the purpose of the beam search. In addition, the terminal may perform an efficient beam search procedure by making maximum use of resources allocated for beam search. Hereinafter, a procedure for maintaining an optimal beam direction identified through beam search will be described with reference to FIGS. 12 and 13.

Direction Compensation

Figure 12:
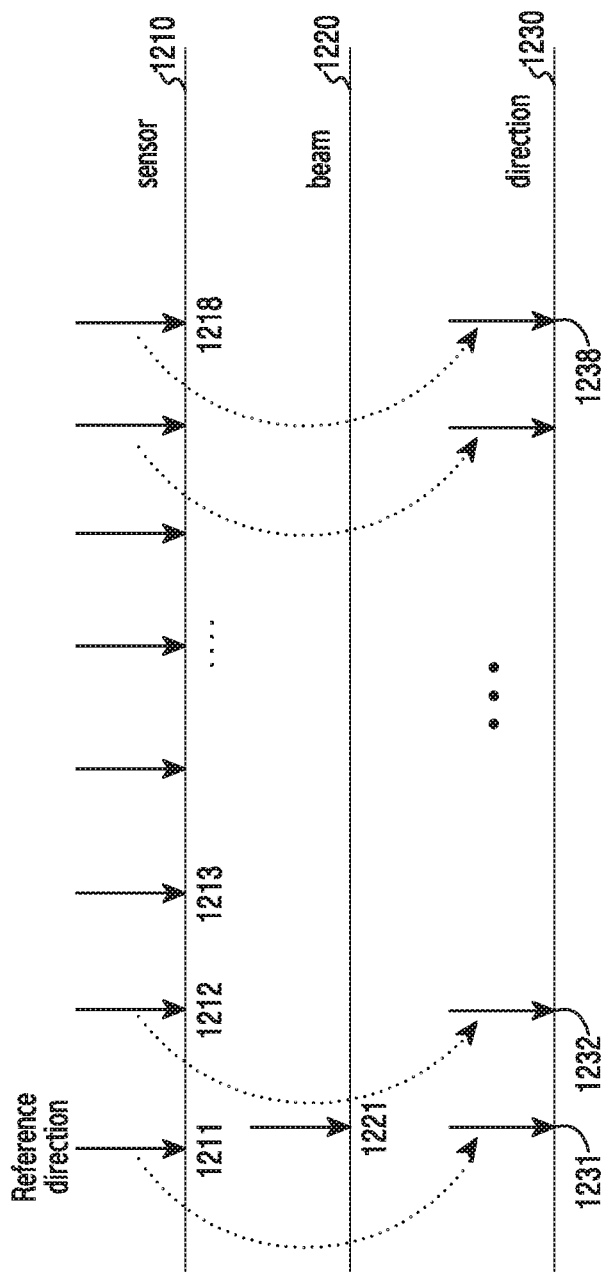
FIG. 12 illustrates directivity control for direction compensation according to various embodiments of the disclosure.

FIG. 12 illustrates an example of directivity control for direction compensation according to various embodiments of the disclosure. Hereinafter, the base station 110 of FIG. 1 will be illustrated as an example of a base station, and the terminal 120 (or the terminal 130) of FIG. 1 will be illustrated as an example of a terminal. Hereinafter, the case where a reception beam of a terminal for downlink communication is selected (or identified) through a beam search procedure will be described. Hereinafter, the beam of the terminal, which is set through the beam selection, will be referred to as a "communication beam".

A direction compensation procedure, which will be described later, is the same as or similar to some operations in the beam search procedure for the directivity fixation described in FIGS. 7 and 8. This is due to the fact that the direction compensation procedure is also aimed at obtaining the optimal quality of communication with the base station by maintaining the direction of a communication beam. Hereinafter, the description the same as or similar to that of the beam search procedure for the directivity fixation will be omitted. The direction compensation may be referred to as "direction tracking".

Referring to FIG. 12, an axis 1210 represents a time domain for reporting of the sensor measuring the movement of the terminal. The terminal may obtain measurement information every predetermined period. For example, the terminal may sequentially obtain first measurement information at a time 1211, second measurement information at a time 1212, third measurement information at a time 1213, fourth measurement information at a time 1214, fifth measurement information at a time 1215, sixth measurement information at a time 1216, seventh measurement information at a time 1217, and eighth measurement information at a time 1218.

An axis 1220 represents a time domain for communication beam configuration of the terminal. The terminal sets a communication beam at a time 1221 through a beam search procedure. The terminal may identify beams corresponding to values obtained through the beam search procedure {for example, an RSRP value indicating the best quality among the RSRP values (e.g., the maximum RSRP value)}. The terminal may set the identified beam as a communication beam. The terminal may set most recently obtained sensor information as a reference sensor value when setting the communication beam at the time 1221. The terminal may set the measurement information obtained at the time 1211 as a reference sensor value.

An axis 1230 represents a time domain for direction compensation. The terminal may determine the direction in which the communication beam of the terminal is oriented at a time 1231 corresponding to the time (the time 1221) of setting the communication beam. The terminal may set the direction indicated by the communication beam, which corresponds to the reference sensor value, as a reference direction. The terminal may set the reference direction for direction compensation. When the direction indicated by the communication beam changes from the reference direction, the terminal may compensate for the movement of the terminal using the amount of change with respect to the set reference direction.

The terminal may determine the directions for respective beams available in the terminal from the reference sensor value and the obtained measurement information. When obtaining the measurement information at the time 1212, the terminal may determine whether or not the direction of the currently set communication beam falls within the effective range of the reference direction at the time 1232 corresponding to the time 1212. If the direction of the currently set communication beam does not fall within the effective range of the reference direction, the terminal may identify a beam having a direction component belonging to the effective range of the reference direction. The terminal may maintain communication directivity in the reference direction through the newly identified beam. That is, the terminal may compensate for the direction of the beam that varies with the movement.

The terminal may determine the directions of the communication beams set from the time 1232 to the time 1238 so as to correspond to the measurement information obtained from the time 1212 to the time 1218, and may determine whether or not the directions of the set communication beams fall within the effective range. If the direction of the set communication beam falls within the effective range, the terminal may maintain the direction of the set communication beam, and if the direction of the set communication beam is out of the effective range, the terminal may identify another beam, thereby maintaining (fixing) the directivity of the reference direction.

The terminal may communicate with the base station using at least one beam in the reference direction. The terminal may periodically obtain measurement information from a sensor in order to maintain the reference direction. Since the terminal does not always move or does not always change the direction whenever it performs communication, the terminal may adaptively set a period for obtaining measurement information (obtaining period).

In some embodiments, the terminal may set the obtaining period according to an application that is in use for communication. For example, when downloading a file through an application, the obtaining period may be set longer than a reference period. Here, the reference period is a default value, which may be set by a user or may be set through statistical information of the terminal. As another example, when a streaming service is provided through an application, the obtaining period may be set to be shorter than the reference period in order to minimize the latency of the provided service. As another example, the obtaining period of an application having the higher frequency of use of a sensor than normal applications, such as applications (for example, a game application) in which input is provided through the motion of a user, may be set to be shorter than the reference period.

In some other embodiments, the terminal may set the obtaining period depending on connectivity of the terminal. For example, if the terminal is connected to another device (e.g., a laptop, a docking station, a TV set, or the like) or is being charged, the obtaining period may be set to be longer than the reference period. As another example, when the terminal is connected to a vehicle, the obtaining period may be set to be shorter than the reference period.

In some other embodiments, the terminal may set the obtaining period through a learning operation. The terminal may store information on a movement pattern according to the service utilization of a user. Here, the movement pattern may include at least one of a movement generation period, a movement generation type (e.g., the linear movement or the rotation movement), and a movement generation interval for each provided service. The terminal may periodically update information on the movement pattern. The terminal, based on the updated information, may adaptively set the obtaining period. For example, the obtaining period may be set for each application through a learning operation.

Figure 13:
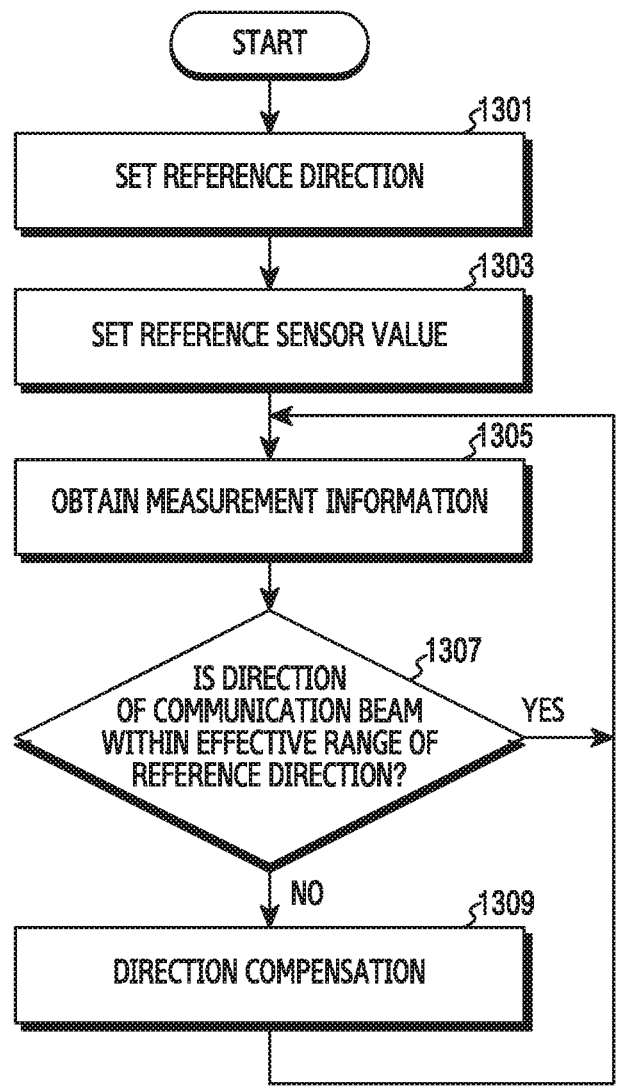
FIG. 13 illustrates a flowchart for the operation of a terminal that performs directivity control for direction compensation according to various embodiments of the disclosure.

FIG. 13 illustrates a flowchart for the operation of a terminal that performs directivity control for direction compensation according to various embodiments of the disclosure. The terminal 120 (or the terminal 130) of FIG. 1 will be illustrated as an example of a terminal.

Referring to FIG. 13, in operation 1301, the terminal may set a reference direction. The terminal may set, as a reference direction, the direction of a beam identified through a beam search procedure.

In operation 1303, the terminal may set a reference sensor value. The terminal may set the reference sensor value using the most recently reported measurement information since the time of setting the reference direction. Since operation 1303 corresponds to operation 803 in FIG. 8, the detailed description of operation 1303 will be omitted.

In operation 1305, the terminal may obtain measurement information. The terminal may obtain measurement information from a sensor according to an obtaining period set in the measurement information. In some embodiments, the terminal may adaptively set the obtaining period according to the connection state between the terminal and the other devices or an application that is in use in the terminal. The terminal may identify one of a plurality of set values for the obtaining period, and may set the obtaining period.

In operation 1307, the terminal may determine whether or not the direction of the set communication beam falls within the effective range of the reference direction. Since operation 1307 corresponds to operation 807 in FIG. 8, the detailed description of operation 1307 will be omitted.

In operation 1309, the terminal may perform direction compensation. The terminal may determine a value indicating the degree of movement of the terminal (hereinafter, referred to as a "movement value") through the reference sensor value set in operation 1303 and the measurement information obtained in operation 1305. The terminal may identify a beam corresponding to the reference direction set in operation 1301 according to the currently set beam and the movement value. The terminal may determine the identified beam as a communication beam. The terminal may determine parameters associated with the communication beam through the index of the determined communication beam. The terminal may configure such that a beamforming unit forms the identified beam using the determined parameters. The terminal may perform direction compensation, and may then receive or transmit signals from or to the base station through the set communication beam.

Although it is not shown in FIG. 13, the terminal may reset the reference sensor value during the communication with the base station. In some embodiments, if the set communication beam is maintained for a specific period of time or longer, the terminal may reset the measurement information, which is in use, as the reference sensor value. The terminal may reduce the amount of calculation by resetting the reference sensor value.

On the other hand, if the set reference direction becomes out of the range of directions (hereinafter, referred to as "direction coverage" or "threshold range") in which the beams of the terminal can be oriented after the movement, the terminal may require a new beam search procedure. In some embodiments, if the reference direction becomes out of the direction coverage (that is, if the beam configuration to the reference direction is impossible), the terminal may transmit a request message to the base station so as to perform a new beam search procedure. The terminal may make a request to the base station for allocation of resources for a new beam search procedure.

A beam search procedure and a direction compensation procedure of a terminal according to various embodiments have been described with reference to FIGS. 7 to 13. Hereinafter, embodiments for calculation and comparison between information on beams and information on directions for transformation from a beam domain to a direction domain will be described with reference to FIGS. 14 and 15.

Quantification of Movement

FIG. 14 illustrates an example of mapping the movement of a terminal with a beam index according to various embodiments of the disclosure. The terminal 120 (or the terminal 130) of FIG. 1 will be illustrated as an example of a terminal.

Referring to FIG. 14, the terminal may manage the beams of the terminal using indices. Respective indices may correspond to the respective beams. The terminal may manage direction information on the respective beams by mapping the same with the indices. The direction information may be expressed in a three-dimensional coordinate system for respective directions of the beams. For example, a coordinate space 1400 represents a three-dimensional configuration of the beams of the terminal. The coordinate space 1400 represents a three-dimensional configuration for 19 beams operable in the terminal. Here, the beam width of each of the beams may have an interval of 10 degrees. The beams of the terminal in the coordinate space may be represented as a two-dimensional configuration as shown in a plan view 1450.

The direction difference between the beams may be quantified. A reference beam may be set to quantify the direction difference between the beams. For example, a beam 0 may be set as a reference beam. Direction information 1410 of the set reference beam may be (0,0,0). The differences between the directions of the respective beams other than the reference beam and the direction of the reference beam may be determined from the direction information 1410 of the reference beam. For example, the direction difference between the beam 0 and a beam 1 may be quantified as an xyz coordinate value. Direction information 1411 of the beam 1 may be (10,0,0). As another example, the direction difference between the beam 0 and a beam 7 may be quantified. Direction information 1417 of the beam 7 may be (20,0,0).

Information indicating the direction differences between beams on the coordinate system, such as the coordinate space 1400, may be referred to as "beam distances". The terminal may utilize the beam distances when using the direction differences between the beams operated for communication with the base station. The terminal may store the beam distances between the beams. For example, the terminal may store the beam distances between the reference beam and the remaining beams. For example, the terminal may store a mapping table indicating a relationship between the beam distances between the reference beam and the remaining beams and respective indices of the remaining beams. The terminal may identify a beam corresponding to a specific direction using beam length information, which includes the beam distances between the beams, and measurement information from a sensor.

In some embodiments, the apparatus of the present disclose comprises a storage for storing beam distance information for each of a plurality of beams. The beam distance information comprises information regarding a reference beam among the plurality of beams, and information for indicating a difference between the reference beam and another beam among the plurality of beams.

The terminal may quantify the movement thereof, which is measured through a sensor. The terminal may quantify the movement, thereby determining a measured value. For example, the terminal may measure the rotational movement of the terminal through a gyro-sensor. The terminal may determine a first measured value at a time $t_0$ and a second measured value at a time $t_1$. The gyro-sensor senses angular velocity values, so that the terminal may determine the first measured value $(x_0, y_0, z_0)$ at the time $t_0$ and the second measured value $(x_1, y_1, z_1)$ at the time $t_1$.

The terminal may determine a value indicating directional change (hereinafter, referred to as a "directional change value") using the measured values, which are measured every time. For example, the terminal may determine the directional change value (d) according to the following equation.

$$d = (x_1 - x_0, y_1 - y_0, z_1 - z_0) \times (t_1 - t_0) \quad \text{Equation 1}$$

Here, "d" is the directional change value, $(x_0, y_0, z_0)$ is the first measured value (angular velocity value) at the time $t_0$, $(x_1, y_1, z_1)$ is the second measured value (angular velocity value) at the time $t_1$.

The terminal may determine the amount of change in the measured value with time as the directional change value. For example, the directional change value may be (−11, 1, −2).

The terminal may identify a beam corresponding to the determined directional change value. For example, if the beam 0 corresponds to the reference direction, the terminal may identify a beam corresponding to the directional change value from the beam 0. For example, the terminal may identify the beam 1. The first beam may be a beam having the smallest difference between the beam distance to the beam 0 and (11, −1, 2), among a plurality of beams.

Based on the difference between the beam distance {e.g., (0,0,0) in the case where the reference beam is currently used} of the currently used beam (e.g., the beam set to be oriented in the reference direction before the movement) and the directional change value, among a plurality of beams, the terminal may identify another beam. For example, the terminal may inversely calculate (e.g., subtract) the difference of the directional change value from the beam distance of the currently used beam, thereby calculating a target direction value. The target direction value may be a value indicating the reference direction relative to the direction of the reference beam after the movement. Among a plurality of beams, the terminal may identify a beam having the smallest beam distance, which has the minimum difference with the target direction value. For example, in the case where the beam distance of the currently used beam is (0,0,0) (that is, in the case where the terminal is set with a reference beam), if the directional change value is (−11,1,−2), the terminal may identify direction information 1417 having a value close to (11,−1,2). The terminal may identify the beam 1 from the direction information 1417.

If the terminal performs beamforming using parameters (phases, antenna angles, power, and the like), such as the case of managing the beams using indices, instead of managing the beams using quantized information, in some embodiments, the terminal may perform beamforming by adjusting the parameters corresponding to the target direction.

As described above, the terminal may identify the beam corresponding to the reference direction only by means of the sensor information without the aid of a protocol. The terminal may calculate a directional change through the measurement information, which is measured or obtained every predetermined period, and may identify a beam index corresponding to the calculated directional change, thereby determining the direction of the beam depending on the movement.

Figure 15:
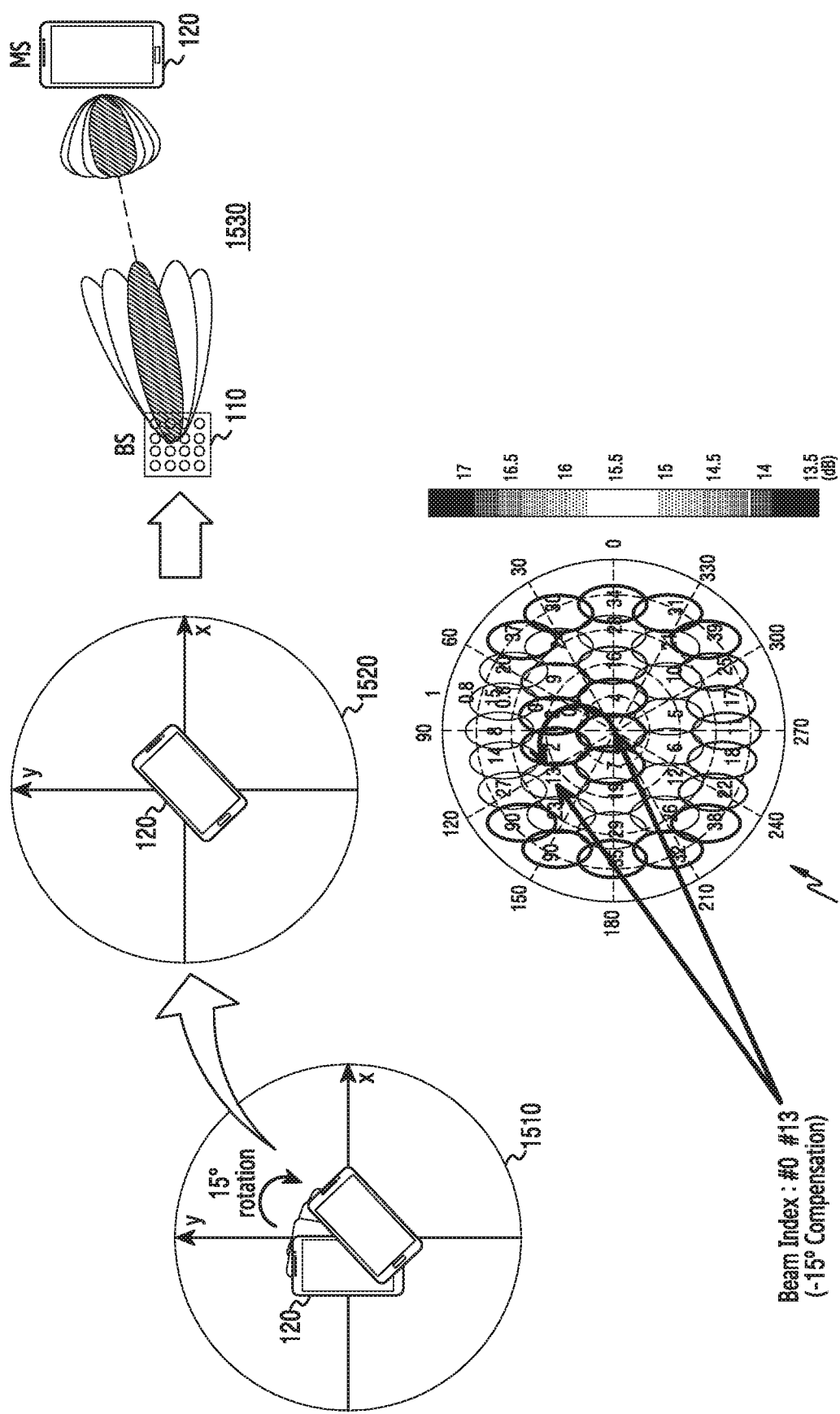
FIG. 15 illustrates directivity control using beam indices according to various embodiments of the disclosure.

FIG. 15 illustrates an example of directivity control using a beam index according to various embodiments of the disclosure. The base station 110 of FIG. 1 will be illustrated as an example of a base station, and the terminal 120 (or the terminal 130) of FIG. 1 will be illustrated as an example of a terminal.

Referring to FIG. 15, in a situation 1510, the terminal may be rotated by an external force such as motion of a user or the like. For example, the terminal may be rotated by 15 degrees in the clockwise direction on the x-y plane. The terminal may set a reference direction to compensate for the rotational movement. The terminal may determine a reference sensor value corresponding to the reference direction. For example, the terminal may determine a reference value of a gyro-sensor.

In situation 1520, the terminal may determine the amount of change in the movement. For example, the terminal may determine a measured value of the gyro-sensor to correspond to the movement of 15 degrees. The terminal may compare the measured value of the gyro-sensor with a reference value, thereby quantifying the movement.

As shown in a sectional beam diagram 1525, the terminal may compensate for the direction. The terminal may determine the direction corresponding to the movement value quantified in the situation 1520. A storage unit in the terminal (e.g., the storage unit 220 in FIG. 2) may store a beam table. The beam table may include direction information indicating the direction of the beam (e.g., a vector value on the xyz coordinate system). Based on the direction of the currently set beam and the quantified movement value, the terminal may identify a beam corresponding to the reference direction. For example, if the direction corresponding to the beam 0 is the reference direction and the sensor value at the time of setting the beam 0 is the reference sensor value before the movement, the terminal may determine the direction in which the beam 0 is oriented after the movement. Based on the direction of the beam 0 and the movement value after the movement, the terminal may determine that a beam 13 currently corresponds to the reference direction. The terminal may change the set beam index from 0 to 13. The terminal may set the beamforming unit using the beamforming parameters corresponding to the beam 13.

In a situation 1530, the terminal may communicate with the base station by compensating for the movement. The terminal may set a communication beam corresponding to the reference direction to thus perform communication with the base station. For example, the terminal may communicate with the base station via the beam 13 in the direction of the beam 13 after the movement, which is the same direction as the direction of the beam 0 (the reference direction) before the movement.

Beam Group Control

Figure 16:
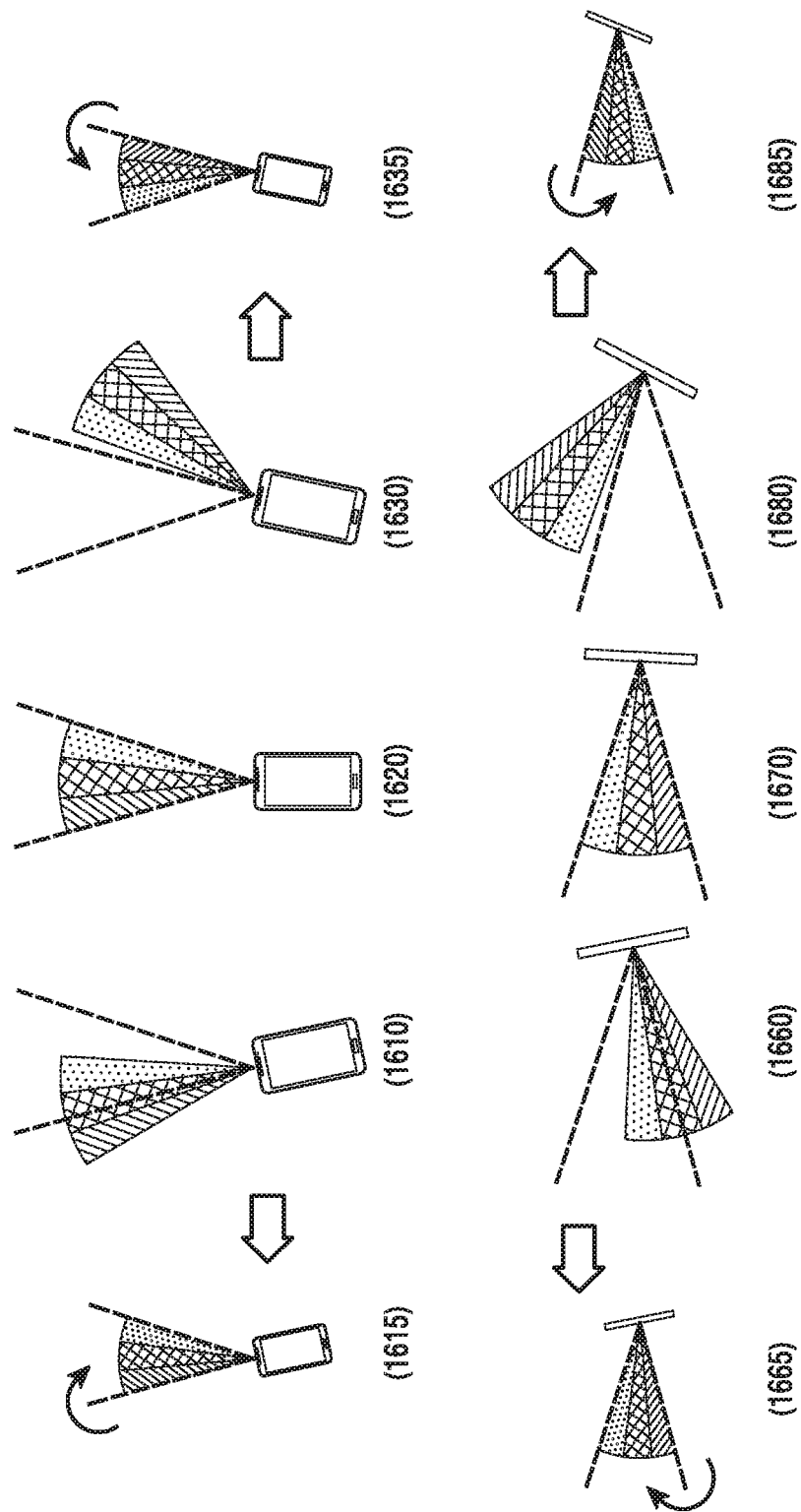
FIG. 16 illustrates directivity control for a beam group according to various embodiments of the disclosure.

FIG. 16 illustrates an example of directivity control for a beam group according to various embodiments of the disclosure. The terminal may manage the beams as a group for efficient beam search or beamforming communication. Hereinafter, a beam group control procedure will be described with reference to an example in which the terminal performs a beam search in the unit of a group including two or more beams or an example in which the terminal performs beamforming communication with the base station using two or more beams (e.g., a beam having the largest RSRP and a beam having the second largest RSRP).

Referring to FIG. 16, the terminal may perform the operations, which will be described below, in order to maintain the directivity of the beams in the beam group. There may be three situations in which the directivity of a group varies with the movement of the terminal. The three situations include a first situation in which some of the currently used beams are out of a range in which the direction is desired to be maintained (hereinafter, referred to as a "reference range"), a second situation in which all of the currently used beams fall within the reference range, and a third situation in which all of the currently used beams are out of the reference range. The reference range may be determined from the coverage of the set beams when the terminal sets the reference direction. For example, the reference range may be determined from an effective range of direction of each of the set beams. Hereinafter, the operations of the terminal for controlling the beam group will be described for each situation. The reference range may be referred to as a "tolerance range".

First Situation: Some Beams Deviate

In the first situation 1610 or 1660, the terminal may perform control such that the directions of the deviating beams of a currently set beam group are oriented within the reference range. The terminal may perform control such that the directions of the respective beams of the currently set beam group are oriented within the reference range.

In some embodiments, the terminal may control one or more deviating beams, among all of the beams in the beam group. The terminal may perform direction compensation (or direction correction) for maintaining directivity with respect to each of one or more deviating beams. The terminal may perform direction compensation in consideration of a reference range. Here, the reference range may correspond to a direction range (direction coverage) covered by a single group. In the case where the terminal is tilted by 15 degrees from the north, if the terminal identifies a beam, which has deviated from the reference range (a deviating beam), only by compensating for the movement of 15 degrees, the terminal identifies the beam that has already been included in the group. Thus, the terminal according to various embodiments may identify at least one target beam in consideration of the magnitude of the reference range as well as a directional change value for at least one deviating beam in the beam group. The terminal may include the index of the identified target beam in the beam index list of the set group. The terminal may exclude at least one deviating beam from the beam index list of the set group.

In some other embodiments, the terminal may control the beams such that directivity maintenance is performed for all of the beams in the beam group. The terminal may perform direction compensation (or direction correction) for maintaining directivity with respect to all of the beams in the beam group including the deviating beams. Here, the direction compensation procedure may correspond to operation 1309 in FIG. 13 (the direction correction procedure may correspond to operation 809 in FIG. 8). The terminal may identify target beams for the respective beams of the beam group through the direction compensation procedure. The indices of the target beams may overlap, in part, the indices included in the beam index list of the currently set beam group. However, the terminal may reduce the amount of calculation by compensating for the direction in the same manner as the direction compensation procedure for the individual beams.

The terminal may reset the beam group every time it performs beam group control for maintaining directivity. The terminal may correct the indices of the beams included in the group depending on the movement, thereby performing efficient beam group control. The terminal may perform a beam search and beamforming communication with the base station via the corrected beam group.

By resetting the beam group, the terminal may set the beam group such that all of the beams in the beam group are oriented within the reference range. For example, the terminal may reset a horizontal beam group so as to be oriented within the reference range (1615). The terminal may also reset the vertical beam group so as to be oriented within the reference range (1665).

Second Situation: Beam Group Matches

In the second situation 1620 or 1670, since all of the beams in the currently set beam group are oriented within the reference range, the terminal may not perform a procedure to change or compensate for the beams. For example, the terminal may maintain the set horizontal beam group (1620). The terminal may maintain the set vertical beam group (1670).

Third Situation: All Beams Deviate

In the third situation 1630 or 1680, the terminal may perform control such that the respective directions of all of the beams in the currently set beam group are oriented within the reference range.

The terminal may identify another beam group. The terminal may determine the direction coverage of each of the beam groups depending on the movement through the measurement information obtained from the sensor. The terminal may identify a beam group having the direction coverage oriented within the reference range. The terminal may identify a group index corresponding to the identified beam group. The terminal may change the setting of the beamforming unit using the identified group index.

By changing the beamforming unit using the group index, the terminal may set the beam group such that all of the beams in the beam group are oriented within the reference range. For example, the terminal may reset the horizontal beam group so to be oriented within the reference range (1635). The terminal may also reset the vertical beam group so to be oriented within the reference range (1685).

In some embodiments, if the terminal has failed to identify a beam group having the direction coverage oriented within the reference range, the terminal may temporarily identify a beam group with the highest overlapping range. The terminal may perform the operations described in the first situation, for the temporarily identified beam group, such that the directions of some beams, which are expected to deviate, are oriented within the reference range.

Although FIG. 16 shows the vertical region and the horizontal region separately, the disclosure is not limited thereto. The disclosure can be applied to the case where the terminal does not use a composite beam using a vertical beam (or a vertical beam group) and a horizontal beam (or a horizontal beam group) or the case where the terminal uses a one-dimensional beam through a linear array.

Hybrid Beam Search

Figure 17:
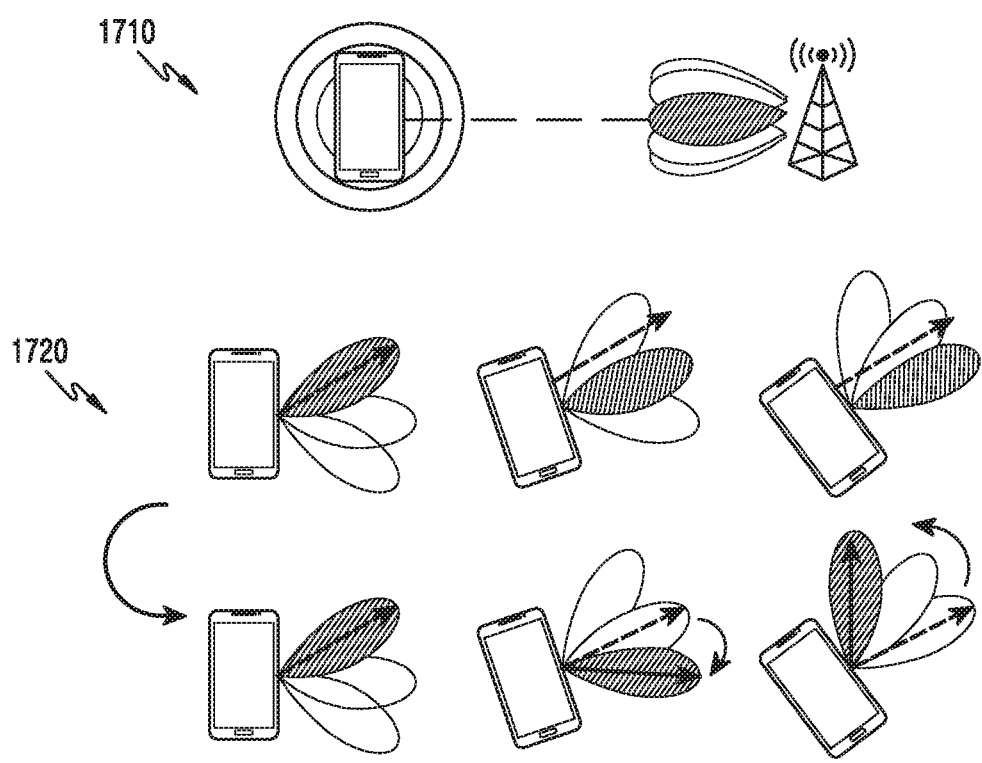
FIG. 17 illustrates directivity control for a hybrid beam search according to various embodiments of the disclosure.

FIG. 17 illustrates an example of directivity control for a hybrid beam search according to various embodiments of the disclosure. The hybrid beam search is a procedure for performing a beam search using both an omni-directional beam and a directional beam when performing a beam search procedure in order to find an optimal beam pair.

Referring to FIG. 17, in operation 1710, the terminal may perform a beam search procedure of the base station. The base station may transmit a plurality of signals through a plurality of transmission beams in order to find an optimal beam of the base station. The plurality of signals are transmitted in different directions (i.e., by different beams). The terminal may receive a plurality of signals through an omni-directional beam. The terminal may receive all of the signals through the omni-directional beam, and may measure the channel quality for each of the signals. The terminal may generate feedback information on the top N signals having good channel quality, and may transmit the feedback information to the base station (beam reporting). The base station may identify an optimal beam to be used for communication from the feedback information.

Even if a rotational movement occurs in the terminal when measuring the channel quality of each of the signals, the terminal may reduce the influence of the rotational movement using an omni-directional beam rather than a directional beam. This is due to the fact that the terminal may receive the respective signals under equivalent conditions.

In operation 1720, the terminal may perform a beam search procedure of the terminal. Unlike operation 1710, the terminal may operate directional beams in order to find an optimal beam. The terminal may sequentially set a plurality of beams, thereby measuring the quality of the signal transmitted from the base station. At this time, the base station may transmit a beamformed signal. In some embodiments, the base station may transmit signals through the optimal beam obtained in operation 1710. In some other embodiments, the base station may transmit signals through transmission beams operable in the base station. In some other embodiments, the base station may transmit signals using an omni-directional beam.

The terminal may perform beam sweeping while changing the reception beam configuration according to the setting of the resources allocated by the base station. If the terminal performs a beam search by sequentially changing only the index of the beam without considering the direction, the direction of the beam does not meet the purpose of the terminal beam search when the terminal moves. Operation 1720 is a downlink reception beam search procedure of the terminal for directivity diversity, and thus the terminal may change the beam such that the directions do not overlap each other. In order to increase the efficiency of beam search in the allocated resources, the terminal identifies the beam corresponding to another direction when the direction to be searched overlaps the previously searched direction (within the effective range). In other words, the terminal according to various embodiments may perform a direction search procedure according to the setting of the allocated resources.

The terminal may identify an optimal direction to communicate with the base station through the direction search procedure. For example, the optimal direction may be the direction in which a highest RSRP value is measured. The terminal may identify the beam corresponding to the identified optimal direction. The terminal may determine the identified beam as an optimal reception beam. Although it is not shown in FIG. 17, the terminal may perform communication with the base station using the optimal reception beam after performing the hybrid beam search. Afterwards, when the terminal moves, the terminal may efficiently maintain the directivity through the direction compensation procedure described with reference to FIGS. 12 and 13.

Beam search procedures for directivity control (e.g., directivity fixation or directivity diversity) and procedures after the beam search, according to various embodiments, have been described with reference to FIGS. 14 to 17. Hereinafter, a procedure for efficiently searching for beams by predicting the movement of the terminal and by limiting the search candidates or reducing the uncertainty of the movement before performing a beam search (that is, a prediction beam search procedure) will be described with reference to FIGS. 18 and 19.

Prediction Beam Search

Figure 18:
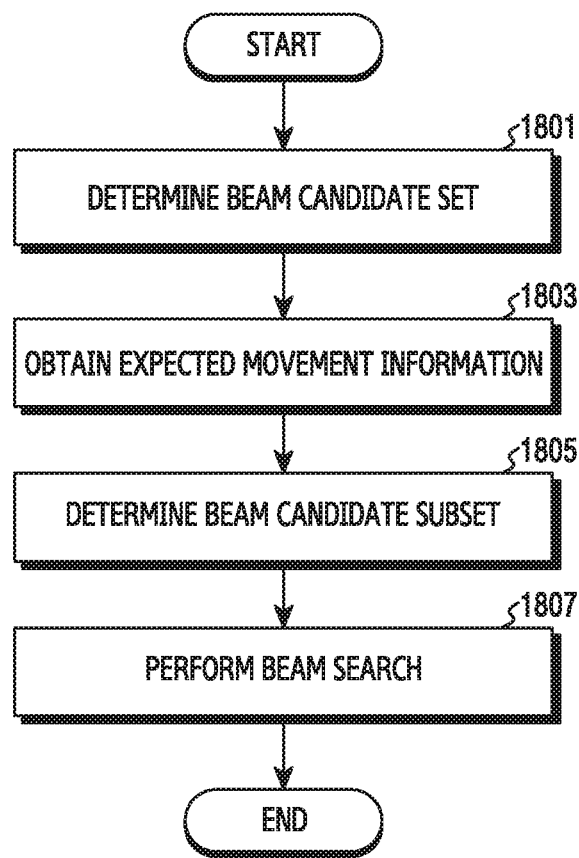
FIG. 18 illustrates a flowchart for the operation of a terminal for a prediction beam search according to various embodiments of the disclosure.

FIG. 18 illustrates a flowchart for the operation of a terminal for a prediction beam search according to various embodiments of the disclosure. The terminal 120 (or the terminal 130) of FIG. 1 will be illustrated as an example of a terminal.

Referring to FIG. 18, in operation 1801, the terminal may determine a beam candidate set. The terminal may determine a beam candidate set including all of the beams (or beam pairs) that the terminal in the initial state can use for communication with the base station. Here, the initial state may be the state in which the movement of the terminal is not considered. The beam candidate set may include possible candidates of beams or beam pairs to be identified through a beam search procedure. In some embodiments, the terminal may determine the beam candidate set, based on at least one of beams that can be formed by the terminal, beams that can be formed by the base station, the number of sectors operating in the base station, the number of beams for each sector, the number of antennas used for downlink communication, and the number of antennas used for uplink communication. The terminal may determine the beam candidate set according to the number of elements that determine the number of cases of the beams. For example, the number of beam candidate sets may be determined by a product of the numbers of cases of respective elements.

In operation 1803, the terminal may obtain expected movement information. Here, the expected movement information may indicate the movement of the terminal for a predetermined period of time or longer depending on the state of the terminal, the setting of the terminal, or the input of the user.

In some embodiments, the terminal may obtain expected movement information of the terminal from a sensor in the terminal. The terminal, based on the measurement information obtained from the sensor, may determine the expected movement information of the terminal. For example, the terminal may sense a linear movement of the terminal through an acceleration sensor. The terminal may obtain the movement direction of the terminal from a measured value of the acceleration sensor. The terminal may determine the expected movement information from the obtained movement direction. As another example, the terminal may sense a rotational movement of the terminal through a gyro-sensor. The terminal may obtain the rotational direction or degree of rotation of the terminal from a measured value of the gyro-sensor. The terminal may determine the expected movement information from the obtained rotational direction and degree of rotation.

In some other embodiments, the terminal may obtain the expected movement information of the terminal from an application. For example, the terminal may obtain the expected movement information of the terminal from path information set by an application (e.g., navigation) searching for a path. As another example, the terminal may obtain information on the range of rotational movement of the terminal (e.g., up-down rotation or left-right rotation of the terminal) when a playback button of a video application providing a streaming video service is clicked.

In some other embodiments, the terminal may obtain the expected movement information of the terminal through a learning procedure by means of machine learning. The terminal may determine patterns of a user. The patterns may be intended to represent movement information. Based on a setting input to the terminal, information measured by a sensor of the terminal, or information received from an external device, the terminal may identify a pattern of the user, which has the highest probability of being performed for a predetermined period of time. The terminal may determine, as expected movement information, movement-related parameter values corresponding to the identified pattern.

Additionally, in some embodiments, the terminal, based on the type of movement of the terminal obtained from the expected movement information, may determine a sensor for measuring the movement of the terminal or a sensor for acquiring measurement information. The type of movement may include whether it is a linear movement or a rotational movement, and whether it is up-down rotation or left-right rotation in the rotational movement. The terminal may turn on only the determined sensor, thereby reducing power consumption of the terminal, or may shorten the obtaining period of the determined sensor, thereby efficiently obtaining a change in the movement of the terminal.

In operation 1805, the terminal may determine a subset of the beam candidate set (hereinafter, referred to as a "beam candidate subset"). The terminal may determine a beam candidate subset from the expected movement information obtained in operation 1803. The terminal may identify the beam candidate subset from the beam candidate set by reducing the number of cases for the elements that determine the beam candidate set. For example, the terminal may obtain, from the expected movement information, a point at which the rotational movement of the terminal within 5 degrees from the north is expected. The terminal may identify only the beams that are oriented within a range of 5 degrees with respect to the north, among the beams of the terminal among the whole beams (or beam pairs) in the beam candidate set. The terminal may identify a beam candidate subset including the identified beams.

A procedure in which the terminal identifies a beam candidate subset among the beam candidate sets may be referred to as "beam restriction", "beam search restriction", or "beam subset restriction". The number of precoders to be used in beamforming may be reduced.

In operation 1807, the terminal may perform a beam search. The terminal may perform a beam search through the beams (or beam pairs) in the beam candidate subset determined in operation 1805. The procedure of performing a beam search through the beams (or beam pairs) in the beam candidate subset may be referred to as a "reduced beam search procedure".

Hereinafter, a detailed example of the prediction beam search procedure in FIG. 18 will be described with reference to FIG. 19.

Figure 19:
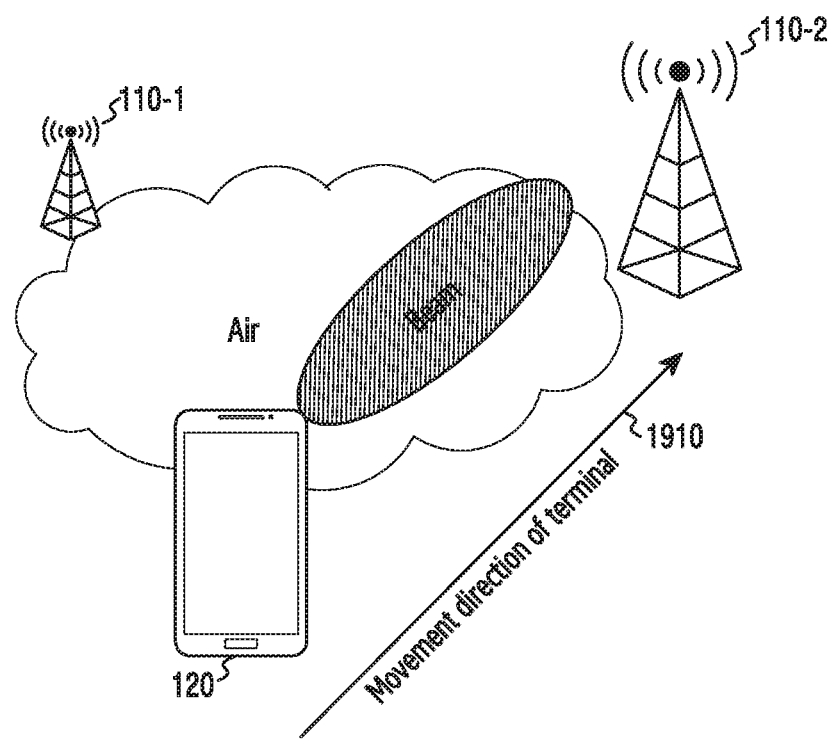
FIG. 19 illustrates a prediction beam search of a terminal according to various embodiments of the disclosure.

FIG. 19 shows an example of the prediction beam search of the terminal according to various embodiments of the disclosure. A first base station 110-1 and a second base station 110-2 illustrate the base station 110 in FIG. 1.

Referring to FIG. 19, the terminal may determine a beam candidate set. Based on at least one of the number of adjacent base stations, the number of sectors in each base station, the number of beams operated in each sector, and the number of beams that can be searched for by the terminal, the terminal may determine the beam candidate set. For example, each base station may operate three sectors and 40 transmission beams for each sector. In the case where the terminal operates 30 beams, the terminal may determine a beam candidate set that includes 7200 ($=2 \times 3 \times 40 \times 30$) beam pairs.

The user of the terminal may move in the direction 1910 to the base station 110-2 with the terminal. The terminal may determine the movement of the terminal in the direction 1910. In other words, the terminal, based on the obtained expected movement information of the terminal, may determine that the terminal is moving in the direction 1910 for a specific period of time or longer. Here, the specific period of time may include a time for performing a beam search procedure and a time for performing beamforming communication by means of the beam identified through the beam search. For example, the terminal may determine the movement in the direction 1910 through an application (e.g., navigation), which is in use. As another example, when the movement in the direction 1910 is detected for a specific period of time or longer through a GPS (global positioning system), the terminal may determine that the terminal is moving in the direction 1910 for a specific period of time or longer.

The terminal may determine a beam candidate subset by excluding some of the beam pairs in the beam candidate set according to the movement direction of the terminal. For example, the terminal may set the second base station 110-2 as a base station for a beam search according to the movement direction of the terminal, and may determine one sector to be searched. The terminal may also identify 20 beams of the terminal, which correspond to the direction 1910 in which the terminal is moving. The terminal may determine a beam candidate subset including 800 ($=1 \times 1 \times 40 \times 20$) beam pairs. Additionally, if the terminal obtains direction information on the respective beams transmitted from the base station, it is possible to reduce the number of transmission beams of the base station. The terminal may perform a beam search using fewer than 800 beams.

In some embodiments, the terminal may inform a serving base station (e.g., the second base station 110-2) of information on the movement direction of the terminal (e.g., the direction 1910). The serving base station may reduce the number of beam candidate subsets operated in the beam search procedure, or may adjust the magnitude of a resource used in the beam search procedure according to the obtained information on the movement direction of the terminal.

In the disclosure, the expression "equal to or more than" or "equal to or less than" is used in order to determine whether or not a specific condition is fulfilled, this is merely intended to express an example, and this does not exclude the meaning of "above" or "below". A condition of "equal to or more than" may be replaced by a condition of "above", a condition of "equal to or less than" may be replaced by a condition of "below", and a condition of "equal to or more than and below" may be replaced by a condition of "above and equal to or less than".

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an apparatus in a wireless communication system, the method comprising:
   transmitting or receiving a signal based on a first direction of a first beam of the apparatus;
   identifying a second direction of a second beam of the apparatus after a movement of the apparatus;
   if the second direction is within a designated range of the first direction of the first beam, identifying a third beam which is different from the second beam, among a plurality of beams for a beam search; and
   if the second direction is not within the designated range of the first direction, transmitting or receiving a signal for the beam search by using the second beam.

2. The method of claim 1, further comprising:
   determining whether a direction of the third beam is within the designated range of the first direction;
   if the direction of the third beam is not within the designated range of the first direction, transmitting or receiving a signal for the beam search by using the third beam; and
   if the direction of the third beam is within the designated range of the first direction, identifying a fourth beam among the plurality of beams for the beam search.

3. The method of claim 1, wherein whether the second beam is usable for the beam search or not is determined based on a difference between the first direction and the second direction.

4. The method of claim 1, further comprising:
   measuring the movement of the apparatus by using a sensor of the apparatus; and
   when the second beam is configured to the apparatus, obtaining measurement information indicating the measured movement of the apparatus.

5. The method of claim 4, wherein the obtaining of the measurement information comprises:
   obtaining the measurement information according to a periodicity configured for an application executed in the apparatus.

6. The method of claim 1, wherein the measurement information comprises a change amount according to the movement of the apparatus with respect to a reference value of a parameter indicating a status of the apparatus.

7. The method of claim 1, further comprising:
   identifying a new direction of the first beam according to the movement of the apparatus, and
   based on identifying that the second direction of the second beam is within a threshold range of the new direction, transmitting or receiving a signal for the beam search using the second beam.

8. The method of claim 1, further comprising:
   determining beam search candidates based on the plurality of beams of the apparatus and a plurality of beams of another apparatus;
   identifying at least one search candidate among the beam search candidates, based on the movement of the apparatus; and
   performing a beam search for at least one beam of the apparatus or at least one beam of the another apparatus corresponding to the at least one search candidate.

9. An apparatus in a wireless communication system, the apparatus comprising:
   at least one transceiver; and
   at least one processor operably coupled to the at least one transceiver,
   wherein the at least one processor is configured to:
      control the at least one transceiver to transmit or receive a signal based on a first direction of a first beam of the apparatus,
      identify a second direction of a second beam of the apparatus after a movement of the apparatus,
      if the second direction is within a designated range of the first direction of the first beam, identify a third beam which is different from the second beam, among a plurality of beams for a beam search, and
      if the second direction is not within the designated range of the first direction, transmit or receive a signal for the beam search by using the second beam.

10. The apparatus of claim 9, wherein the at least one processor is further configured to:
- determine whether a direction of the third beam is within the designated range of the first direction; and
- if the direction of the third beam is not within the designated range of the first direction, transmit or receive a signal for the beam search by using the third beam; and
- if the direction of the third beam is within the designated range of the first direction, identify a fourth beam among the plurality of beams for the beam search.

11. The apparatus of claim 9, wherein whether the second beam is usable for the beam search or not is determined based on a difference between the first direction and the second direction.

12. The apparatus of claim 9, wherein the at least one processor is further configured to:
- measure the movement of the apparatus by using a sensor of the apparatus; and
- when the second beam is configured to the apparatus, obtain measurement information indicating the measured movement of the apparatus.

13. The apparatus of claim 12, wherein, in order to obtain the measurement information, the at least one processor is further configured to:
- obtain the measurement information according to a periodicity configured for an application executed in the apparatus.

14. The apparatus of claim 9, wherein the measurement information comprises a change amount according to the movement of the apparatus with respect to a reference value of a parameter indicating a status of the apparatus.

15. The apparatus of claim 9, wherein the at least one processor is further configured to:
- identify a new direction of the first beam according to the movement of the apparatus,
- based on identifying that the second direction of the second beam is within a threshold range of the new direction, transmit or receive a signal for the beam search using the second beam.

16. The apparatus of claim 9, wherein the at least one processor is further configured to:
- determine beam search candidates based on the plurality of beams of the apparatus and a plurality of beams of another apparatus;
- identify at least one search candidate among the beam search candidates, based on the movement of the apparatus; and
- perform a beam search for at least one beam of the apparatus or at least one beam of the another apparatus corresponding to the at least one search candidate.

17. The apparatus of claim 9, wherein the at least one processor is further configured to:
- determine the first direction as a reference direction;
- identify, in order to perform the beam search, a beam corresponding to the reference direction based on measurement information of the movement of the apparatus; and
- determine the identified beam as a communication beam.

18. An apparatus in a wireless communication system, the apparatus comprising:
- at least one transceiver; and
- at least one processor operably coupled to the at least one transceiver,
- wherein the at least one processor is configured to:
  - determine whether a movement of the apparatus is detected based on measurement information;
  - if the movement of the apparatus is not detected, perform a first beam training using each beam of a plurality of beams;
  - if the movement of the apparatus is detected, identify a subset of the plurality of beams based on the measurement information and perform a second beam training using each beam of the subset of the plurality of beams; and
  - communicate with another apparatus based on a result of the first beam training or the second beam training.

* * * * *